(12) United States Patent
Morishita

(10) Patent No.: US 11,960,781 B2
(45) Date of Patent: Apr. 16, 2024

(54) IMAGE PROCESSING APPARATUS AND JOB EXECUTION CONTROL METHOD CAPABLE OF DISPLAYING SETTING HISTORY ON WHICH PROHIBITION IS SET

(71) Applicant: SHARP KABUSHIKI KAISHA, Sakai (JP)

(72) Inventor: Masahiro Morishita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/985,052

(22) Filed: Nov. 10, 2022

(65) Prior Publication Data

US 2023/0153048 A1     May 18, 2023

(30) Foreign Application Priority Data

Nov. 18, 2021    (JP) ................................. 2021-188220

(51) Int. Cl.
*G06F 3/12*      (2006.01)

(52) U.S. Cl.
CPC .......... *G06F 3/1257* (2013.01); *G06F 3/1204* (2013.01); *G06F 3/1222* (2013.01); *G06F 3/1279* (2013.01)

(58) Field of Classification Search
None
See application file for complete search history.

(56) References Cited

U.S. PATENT DOCUMENTS

2011/0267649 A1    11/2011   Akimoto
2014/0211240 A1*   7/2014   Maki ..................... G06F 3/1222
                                                                     358/1.14

FOREIGN PATENT DOCUMENTS

JP          2011-234170 A    11/2011

* cited by examiner

*Primary Examiner* — Lennin R Rodriguezgonzalez
(74) *Attorney, Agent, or Firm* — ScienBiziP, P.C.

(57) ABSTRACT

An image processing apparatus includes a job executer that executes a job related to image processing, based on a setting history, a setter that sets prohibition on use of the setting history, a display that displays the setting histories including a setting history on which the prohibition is set, and a controller that controls execution of a job, based on the displayed setting histories, and, in executing the job based on the setting history, the controller determines whether to restrict execution of the job, based on a result of determination on whether the setting history is the setting history on which the prohibition is set.

9 Claims, 22 Drawing Sheets

FIG. 3A

| SETTING HISTORY | | | | |
|---|---|---|---|---|
| JOB ID | EXECUTION DATE AND TIME | JOB TYPE | DISPLAY SETTING VALUE | SETTING VALUE FILE NAME |
| 0099 | 2020/02/22 20:20 | COPY | COLOR MODE: FULL COLOR, DOUBLE-SIDED COPY: SINGLE-SIDED → SINGLE-SIDED, COPY DENSITY: AUTOMATIC, ····· | 0099.config |
| 0098 | 2020/02/22 19:19 | E-mail | TO: AAA@sampleA.co.jp, BBB@sampleB.co.jp, FORMAT: HIGHLY COMPRESSED PDF, RESOLUTION: 600 × 600 dpi, FUNCTION: BLANK PAGE SKIP, ····· | 0098.config |
| 0097 | 2020/02/22 18:18 | FAX | TO: 0123456789, sample K.K., TRANSMISSION SIZE: A3, DOCUMENT: DOUBLE-SIDED → SINGLE-SIDED, FUNCTION: TIME DESIGNATION, ····· | 0097.config |
| 0096 | 2020/02/22 18:10 | Scan to SMB | SAVING DESTINATION: ¥¥ USERFOLDER¥TEST, FORMAT: jpeg, FUNCTION: MIXED DOCUMENTS, ····· | 0096.config |
| 0095 | 2020/02/12 09:01 | E-mail | TO: sample@local, FORMAT: ENCRYPTED PDF, RESOLUTION: 300 × 300 dpi, FUNCTION: MIXED DOCUMENTS, BLANK PAGE SKIP, ····· | 0095.config |
| 0094 | 2020/02/11 20:30 | COPY | COLOR MODE: FULL COLOR, DOUBLE-SIDED COPY: SINGLE-SIDED → SINGLE-SIDED, COPY DENSITY: AUTOMATIC, ····· | 0094.config |
| 0093 | 2020/02/11 20:24 | FAX | TO: 0123456789, sample K.K., TRANSMISSION SIZE: A3, DOCUMENT: DOUBLE-SIDED → SINGLE-SIDED, FUNCTION: TIME DESIGNATION, ····· | 0093.config |
| 0092 | 2020/02/11 20:20 | COPY | COLOR MODE: WHITE AND BLACK 2 VALUES, DOUBLE-SIDED COPY: SINGLE-SIDED → DOUBLE-SIDED, COPY DENSITY: CHARACTERS + PHOTOSENSITIVE PAPER PHONOGRAPH, ····· | 0092.config |
| 0091 | 2020/02/11 17:10 | Scan to SMB | SAVING DESTINATION: STANDARD FOLDER, FORMAT: bmp, FUNCTION: MIXED DOCUMENTS, ····· | 0091.config |
| 0090 | 2020/02/11 13:20 | FAX | TRANSMISSION DESTINATION ADDRESS: 0987654321, TRANSMISSION SIZE: A4, DOCUMENT: SINGLE-SIDED → SINGLE-SIDED, ····· | 0090.config |

FIG. 3B

```
0098.congig                                     _ □ ×
○○○  △△△  × × ×

TO: AAA@sampleA.co.jp, BBB@sampleB.co.jp, FORMAT: HIGHLY
COMPRESSED PDF, RESOLUTION: 600 × 600 dpi, PAGE
AGGREGATION: off, CARD SCAN: off, BLANK PAGE SKIP: on,
MIXED DOCUMENTS: on, DOCUMENT PAGE COUNT: off, TRIAL
COPY: off, CONNECTION COPY: off, LARGE-QUANTITY
DOCUMENT MODE: off, MULTI-CROP SCAN/PHOTO CROP:
off, ····
```

FIG. 4

| JOB HISTORY | | | | |
|---|---|---|---|---|
| JOB ID | EXECUTION DATE AND TIME | JOB TYPE | USER NAME | STATUS |
| 0099 | 2020/02/22 20:20 | COPY | aaaaa | FINISHED |
| 0098 | 2020/02/22 19:19 | E-mail | aaaaa | FINISHED |
| 0097 | 2020/02/22 18:18 | FAX | aaaaa | FINISHED |
| 0096 | 2020/02/22 18:10 | Scan to SMB | aaaaa | FINISHED |
| 0095 | 2020/02/12 09:01 | E-mail | aaaaa | FINISHED |
| 0094 | 2020/02/11 20:30 | COPY | bbbbb | FINISHED |
| 0093 | 2020/02/11 20:24 | FAX | bbbbb | FINISHED |
| 0092 | 2020/02/11 20:20 | COPY | ccccc | FINISHED |
| 0091 | 2020/02/11 17:10 | Scan to SMB | aaaaa | FINISHED |
| 0090 | 2020/02/11 13:20 | FAX | | FINISHED |

FIG. 5

| PROHIBITION SETTING TABLE | | | |
|---|---|---|---|
| AUTHORIZED USER | TARGET JOB | PROHIBITION SETTING (SETTING VALUE) | PROHIBITION SETTING (SETTING HISTORY) |
| aaaaa | COPY | COLOR MORE PERMISSION SETTING USE OF SPECIAL FUNCTION USE OF TRANSMISSION FUNCTION DURING COPYING CREATION OF PDF USED FOR PC BROWSING | No |
| | E-mail | TO: AAA@sampleA.co.jp, ····· | No |
| | FAX | 0123456789, ····· | No |
| | Scan to SMB | ——— | Yes |
| | ⋮ | ⋮ | ⋮ |
| bbbbb | ⋮ | ⋮ | ⋮ |
| ⋮ | | | |

FIG. 11

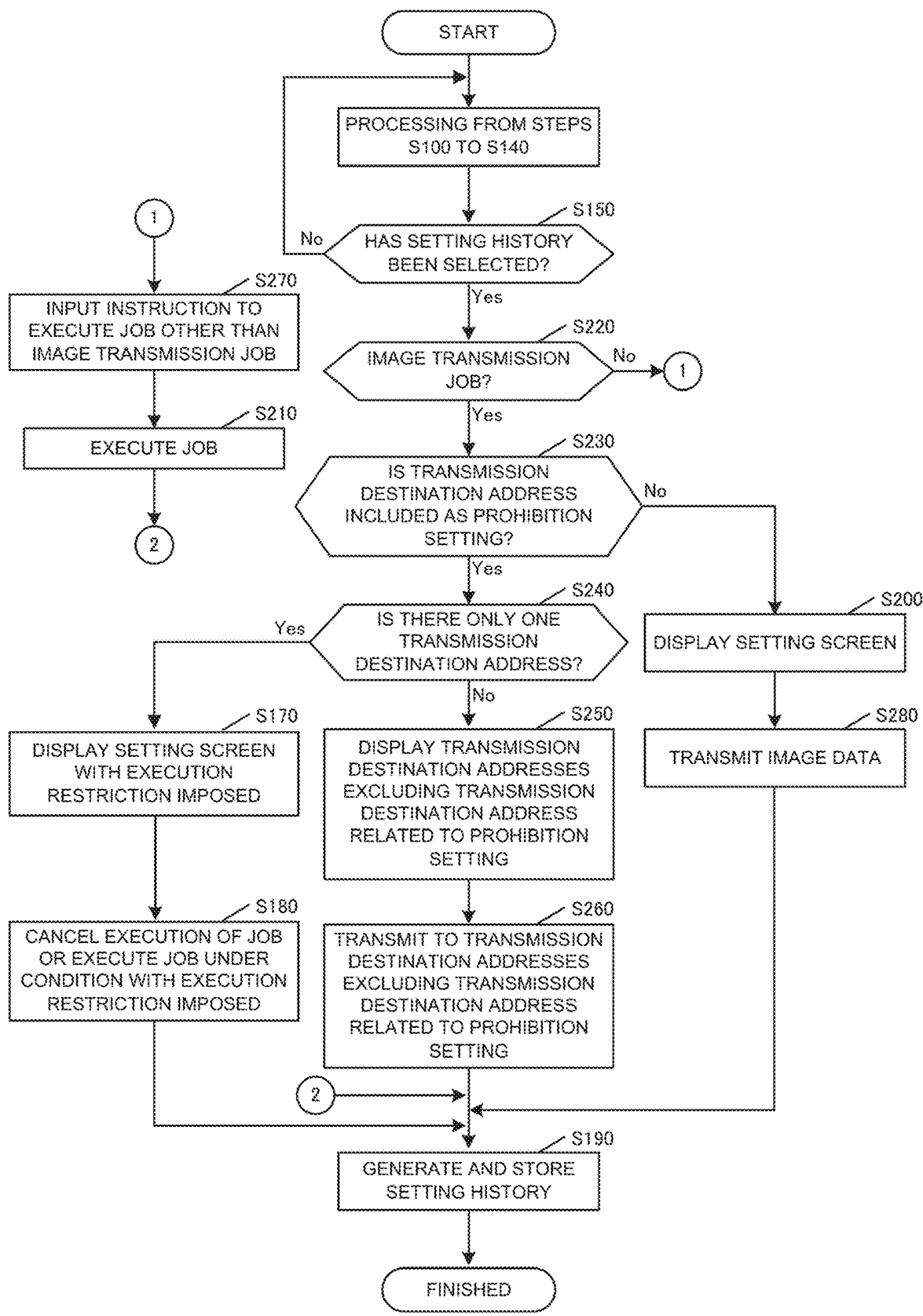

FIG. 17

```
<destination exclusion settings>

<username><data><value>USER A</value></data></username>
<send-type-email>
<destination><data><value>AAA@sampleA.co.jp</value></data></destination>
</send-type-email>

<send-type-fax>
<destination><data><value>0123456789</value></data></destination>

<destination exclusion settings>
```

| | | | |
|---|---|---|---|
| ⊙ HISTORY INFORMATION | | SYSTEM INFORMATION | JOB STATUS |
| RECENT JOB | | | |
| CALL SETTING HISTORY OF SELECTED JOB | | DELETE ALL | ☒ B38 |
| ALL | COPY | SEND/SAVE | |
| COPY | 20:20 02/22 | COLOR MODE: FULL COLOR, DOUBLE-SIDED COPY: SINGLE-SIDED → SINGLE-SIDED, COPY DENSITY: AUTOMATIC, ...... | ■ ⚲ |
| E-mail | 19:19 02/22 | TO: AAA@sampleA.co.jp, BBB@sampleB.co.jp, FORMAT: HIGHLY COMPRESSED PDF, RESOLUTION: 600 × 600 dpi, FUNCTION: BLANK PAGE SKIP, ...... | ■ ⚲ |
| FAX | 18:18 02/22 | TO: 0123456789, sample K.K., TRANSMISSION SIZE: A3, DOCUMENT: DOUBLE-SIDED → SINGLE-SIDED, FUNCTION: TIME DESIGNATION, ...... | ■ ⚲ |
| Scan to SMB | 18:10 02/22 | SAVING DESTINATION: \\ USERFOLDER\TEST, FORMAT: jpeg, FUNCTION: MIXED DOCUMENTS, ...... | ■ ⚲ |
| E-mail | 09:01 02/22 | TO: sample@local, FORMAT: ENCRYPTED PDF, RESOLUTION: 300 × 300 dpi, FUNCTION: MIXED DOCUMENTS, BLANK PAGE SKIP, ...... | ■ ⚲ |
| Scan to SMB | 17:10 02/11 | SAVING DESTINATION: STANDARD FOLDER, FORMAT: bmp, FUNCTION: MIXED DOCUMENTS, ...... | ■ ⚲ |

W30

C10

IMAGE PROCESSING APPARATUS AND JOB EXECUTION CONTROL METHOD CAPABLE OF DISPLAYING SETTING HISTORY ON WHICH PROHIBITION IS SET

BACKGROUND OF THE INVENTION

Field of the Invention

The present disclosure relates to an image processing apparatus and the like.

Description of the Background Art

Some image processing apparatuses, such as multifunctional machines, relate to execution of jobs, such as printing, faxing, image transmission, or the like, and store setting values relating to execution of the jobs as a setting history.

In recent years, attempts have been made to reduce time and efforts of a user involved in job execution by using stored setting histories. Specifically, the image processing apparatus displays the setting histories on a display to allow the user to make a selection. An image processing apparatus that has received selection of a setting history made by the user can easily reproduce a job corresponding to the setting history by executing the job, based on the setting values linked to the setting history.

For such image processing apparatuses, there is a known technology in which erroneous use or unauthorized use of the setting history can be prevented by hiding the setting history related to a prohibited job that is not allowed to be executed.

However, according to a known technology, it is not possible to check setting histories themselves related to jobs that have been executed in past, and it is not possible to track the setting histories of the jobs executed in past, that is, for example, what was sent to whom with what settings, or the like, so that a problem of poor usability arises.

The present disclosure provides an image processing apparatus or the like that can prevent erroneous use or unauthorized use of a setting history while usability is ensured by enabling display of a setting history use of which is prohibited.

SUMMARY OF THE INVENTION

In order to solve the problem described above, an image processing apparatus according to the present disclosure includes a job executer that executes a job related to image processing, based on a setting history, a setter that sets prohibition on use of the setting history, a display that displays the setting histories including a setting history on which the prohibition is set, and a controller that controls execution of a job, based on the displayed setting histories, and, in executing the job based on the setting history, the controller determines whether to restrict execution of the job, based on a result of determination on whether the setting history is the setting history on which the prohibition is set.

A job execution control method according to the present disclosure includes executing a job related to image processing, based on a setting history, setting prohibition on use of the setting history, displaying the setting history including a setting history on which the prohibition is set, and controlling execution of a job, based on the displayed setting history, and the controlling includes determining, in executing the job based on the setting history, whether to restrict execution of the job based on a result of determination on whether the setting history is the setting history on which the prohibition is set.

According to the present disclosure, an image processing apparatus or the like that can prevent erroneous use or unauthorized use of a setting history while usability is ensured by enabling display of a setting history use of which is prohibited can be provided.

BRIEF DESCRIPTION OF THE DRAWINGS

FIGS. 3A and 3B are a table and a view each illustrating a configuration example of a data structure of a setting history according to the first embodiment.

FIG. 4 is a table illustrating a configuration example of a data structure of a job history according to the first embodiment.

FIG. 5 is a table illustrating a configuration example of a data structure of a prohibition setting table according to the first embodiment.

FIG. 11 a view illustrating an operation example according to the first embodiment.

FIG. 15 is a flowchart illustrating a process flow according to a second embodiment.

FIG. 17 is a view illustrating an operation example according to the second embodiment.

FIG. 18 is a view illustrating an operation example according to the second embodiment.

FIG. 21 is a view illustrating a configuration example of a data structure of a setting history according to a third embodiment.

DESCRIPTION OF THE PREFERRED EMBODIMENTS

Embodiments of the present disclosure will be described below with reference to the accompanying drawings. In the present disclosure, a multifunctional machine capable of performing jobs relating to, for example, copying, faxing, image transmission, or the like in a single case will be described as an embodiment of an image processing apparatus. The following embodiments are merely examples used for illustrating the present disclosure and the technical scope described in the scope of the claims is not limited to the following description.

1 First Embodiment

According to a first embodiment, setting histories including a setting history on which a prohibition setting is imposed are displayed and execution of a job based on the setting history on which the prohibition setting is imposed is restricted.

1.1 Functional Configuration

Figure 1:
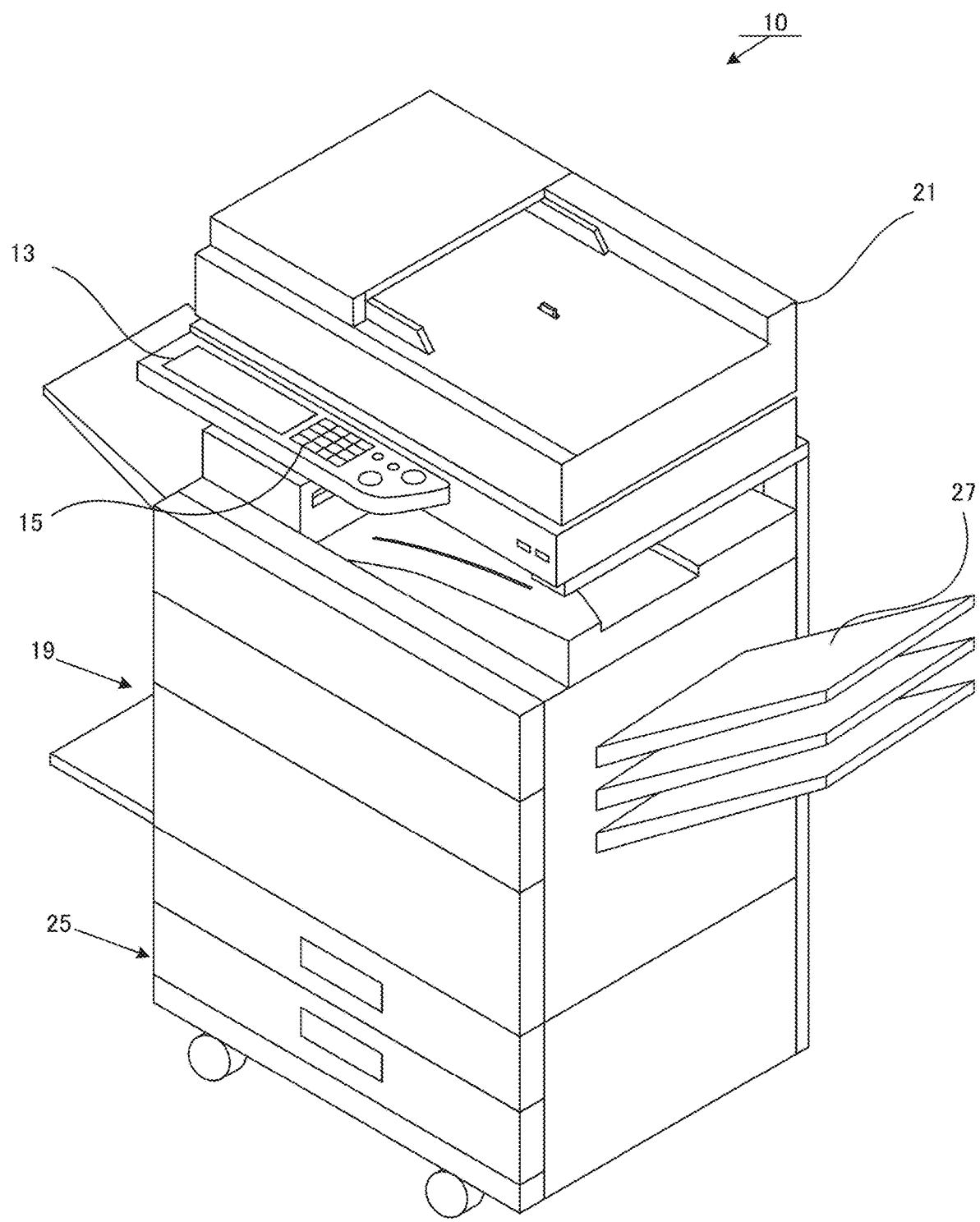
FIG. 1 is a perspective external view of a multifunctional machine according to a first embodiment.
Figure 2:
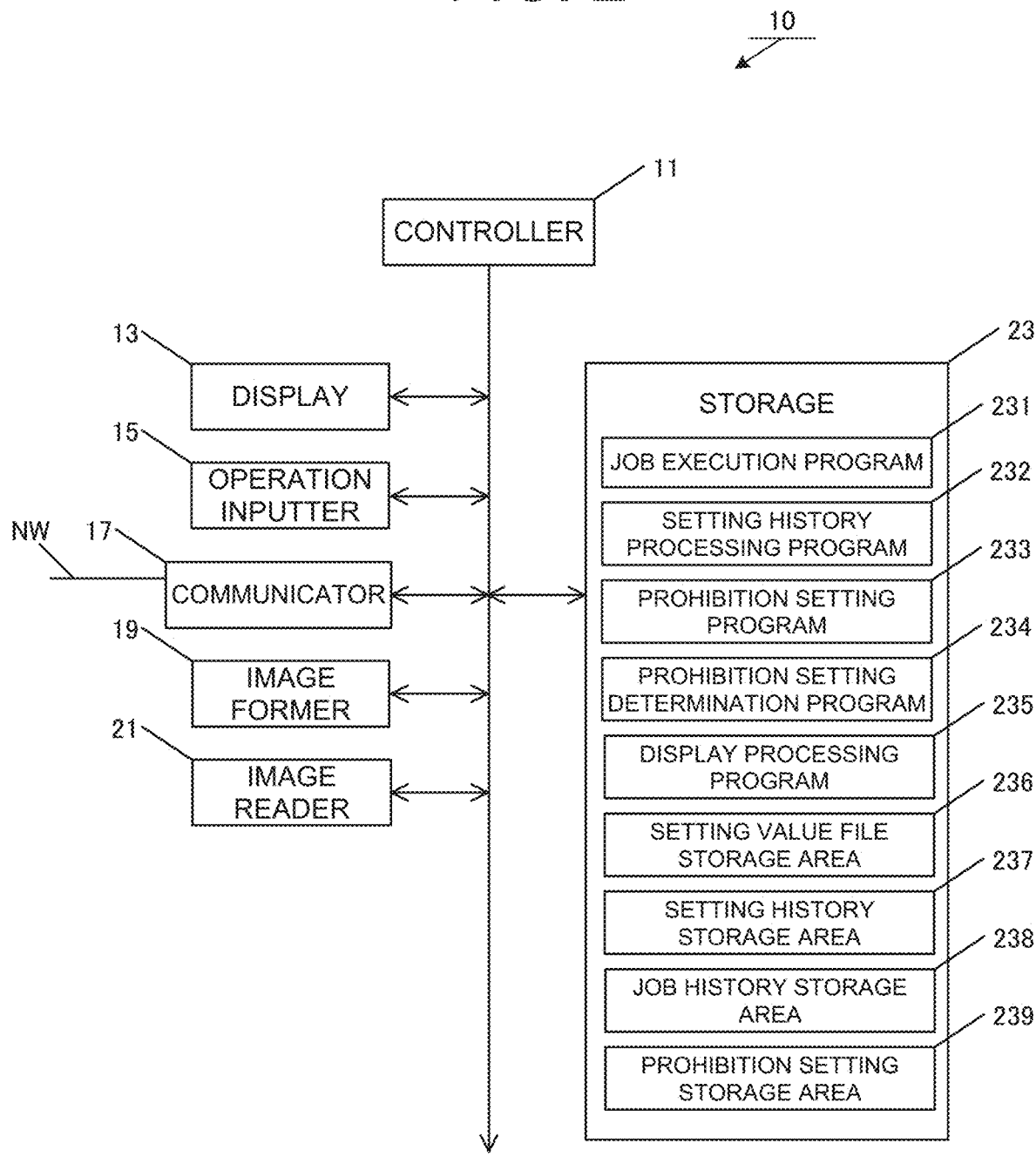
FIG. 2 is a functional configuration diagram of the multifunctional machine according to the first embodiment.

A functional configuration of a multifunctional machine 10 according to the first embodiment will be described with reference to FIG. 1 and FIG. 2. FIG. 1 is a perspective external view of an overall structure of the multifunctional machine 10. FIG. 2 is a functional configuration diagram of the multifunctional machine 10. The multifunctional machine 10 includes a controller 11, a display 13, an operation inputter 15, a communicator 17, an image former 19, image reader 21, and a storage 23.

The controller 11 controls the entire multifunctional machine 10. The controller 11 is formed of, for example, one or more arithmetic operators (central processing units (CPUs) or the like). The controller 11 realizes functions thereof by reading and executing various programs stored in the storage 23.

The display 13 displays various information to a user or the like. The display 13 can be formed of, for example, a liquid crystal display (LCD), an organic electroluminescence (EL)) display, or the like.

The operation inputter 15 receives input of information by the user the like. The operation inputter 15 can be formed of hard keys (for example, a numeric keypad), buttons, or the like. The operation inputter 15 can be formed as a touch panel that allows input via the display 13. In this case, a general method, such as, for example, a resistive, infrared, electromagnetic induction, or capacitance method, can be used as a touch panel input method.

The communicator 17 includes either one or both of a wired or wireless interface used for performing communication with another device via a network (NW), such as, for example, a local area network (LAN), a wide area network (WAN), the Internet, a telephone line, a fax line, or the like.

The image former 19 forms an image based on image data on paper as a recording medium. The image former 19 feeds paper from a paper feeder 25, forms an image based on image data on the paper, and then discharges the paper to the paper discharger 27. The image former 19 can be formed of, for example, a laser printer using the electrophotographic method or the like. In this case, the image former 19 forms an image using toner supplied from unillustrated toner cartridges corresponding to toner colors (for example, cyan, magenta, yellow, and black).

The image reader 21 scans and reads a document image to generate image data. The image reader 21 can be formed, for example, as a scanner including an image sensor, such as a charge coupled device (CCD), a contact image sensor (CIS), or the like. The image reader 21 is not limited to a configuration thereof if the image reader 21 is configured to generate image data by reading a reflected light image from the document image with an image sensor.

The storage 23 stores various programs and various types of data necessary for an operation of the multifunctional machine 10. The storage 23 can be formed of, for example, a storage device, such as a random access memory (RAM), a hard disk drive (HDD), a solid state drive (HDD), a solid state drive (SSD), a read only memory (ROM), or the like.

In the first embodiment, the storage 23 stores a job execution program 231, a setting history processing program 232, a prohibition setting program 233, a prohibition setting determination program 234, and a display processing program 235 and ensures a setting value file storage area 236, a setting history storage area 237, a job history storage area 238, and a prohibition setting storage area 239.

The job execution program 231 is a program read by the controller 11 in order to perform processing associated with execution of each function, such as copying, faxing, image data transmission, or the like, for each job. The controller 11 that has read the job execution program 231 executes a job by controlling the display 13, the operation inputter 15, the communicator 17, the image former 19, the image reader 21, or the like that function as job executers. The controller 11 that has read the job execution program 231 can execute various jobs, based on setting values contained in a setting value file of a setting history.

The setting history processing program 232 is a program read by the controller 11, for example, in acquiring setting values related to job execution, generating a setting history, and performing various types of processing on the setting history. The controller 11 that has read the setting history processing program 232 acquires the setting values related to job execution to generate a setting value file containing the setting values. The controller 11 then stores the generated setting value file in the setting value file storage area 236. The controller 11 also generates a setting history by linking the setting value file to identification information (or example, a job ID) used for identifying to which job the setting value file is related. The controller 11 then stores the generated setting history in the setting history storage area 237.

The prohibition setting program 233 is a program read by the controller 11 in setting prohibition on use of the setting history (which will be hereinafter referred to as "prohibition setting"). The controller 11 that has read the prohibition setting program 233 functions as a setter. A prohibition setting as used in the present disclosure is a setting imposed on the setting history corresponding to a job in order to restrict execution of the job or some of the functions of the job. In this case, the prohibition setting may be imposed on the setting history itself or on a specific setting value contained in the setting value file. The controller 11 determines an execution mode of the job based on the setting history in accordance with a result of determination on whether the setting history is a setting history related to the prohibition setting.

The prohibition setting determination program 234 is a program read by the controller 11 in determining whether the setting history is the setting history related to the prohibition setting in executing the job based on the setting history. The controller 11 that has read the prohibition setting determination program 234 determines whether a prohibition setting is imposed on the setting history. Specifically, the controller 11 compares each setting value in the setting history or the setting value file related to execution of a job with setting values in a prohibition setting table described below and determines whether the setting history is a setting history related to a prohibition setting.

If the controller 11 determines that the setting history is a setting history related to a prohibition setting, the controller 11 can restrict execution of the job, as a job implementation mode. Alternatively, if the prohibition setting targets a specific setting value in the setting value file, the controller 11 can execute the job, based on other setting values excluding the setting value on which the prohibition setting is imposed.

In the present disclosure, "restricting execution of a job" includes, in addition to a mode in which a job is not executed, a mode in which a warning screen or the like is superimposed on a job execution instruction input button displayed on the display 13 and thus is displayed to temporarily prevent execution of the job, or the like. In this case, for example, it is possible to set obtaining a consent of an administrator as a condition for execution of a job.

The display processing program 235 is a program read by the controller 11 in displaying a display screen that displays a list of setting histories, a setting screen that receives input of various setting values, execution instructions, termination instructions, or the like related to execution of a job, a basic screen (for example, a home screen) that displays the setting screen in a switchable manner, a login screen used for user authentication, or the like on the display 13.

The setting value file storage area 236 is a storage area in which the setting value file generated by the controller 11 that has read the setting history processing program 232 is stored. The setting values include, for example, setting values of a color mode, a resolution, a format, a density, or the like, that have been set by the user and setting values, such as initial values for a device or the like held by the device itself. The controller 11 that has read the job execution program 231 acquires the setting value file linked to the setting history as an execution target from the setting value file storage area 236 and executes a job based on the setting values contained in the setting value file.

The setting history storage area 237 is a storage area in which the setting history generated by the controller 11 that has read the setting history processing program 232 is stored. The setting history stored in the setting history storage area 237 is read as appropriate during list display processing or execution of a job based on the setting history.

The setting history according to the present disclosure will be described below. FIG. 3A is a table illustrating a configuration example of a data structure of the setting history stored in the setting history storage area 237. FIG. 3B is a view illustrating a configuration example of the data structure of the setting value file linked to the setting history in FIG. 3A.

The setting history illustrated in FIG. 3A includes a job ID, execution date and time, a job type, display setting values, and a setting value file name.

The job ID is an identification information used for identifying to which job the setting history is related. The execution date and time indicates date and time when a job was executed. The job type indicates a type of the job to be executed (for example, a copy job, a fax job, an image transmission job (E-mail, scan to SMB, or the like) or the like). The display setting values indicate some of setting values (contents) to be displayed on the display screen that displays a list of setting histories. The setting value file name is a file name of the setting value file linked to the setting history.

For example, the setting history related to a job ID "0099" is setting history related to "copy" as the type of a job executed at 20:20 on Feb. 22, 2020. The job is a copy job executed based on setting values contained in a file with a setting file name "0099.config" and is an example in which setting values (items) of "color mode: full color, double-sided copy: single-sided→single-sided, copy density: automatic, . . . " or the like are set as display setting values displayed on the display screen. The display setting values set for each job ID are examples only, and the setting values displayed on the display screen are not limited to those described in FIG. 3A.

FIG. 3B is a view illustrating an example of a data structure of a setting value file "0098.config" linked to a job ID "0098". The setting value file illustrated in FIG. 3B can be configured as a text file in which setting values related to execution of a job, that is, for example, "To: AAA@.sampleA.co.jp, BBB@.sampleB.co.jp, Format: Highly compressed PDF, Resolution: 600×600 dpi, Page aggregation: off, Card scan: off, Blank page skip: on, Mixed documents: on, Document page count: off, Trial copy: off, Connection copy off, Large-quantity document mode: off, Multi-crop scan/Photo crop: off, . . . " or the like, are stored. In executing a job based on a setting history, the controller 11 executes the job related to the setting history using setting values stored in the setting value file. When processing related to the job is finished, the controller 11 stores the setting values that have been used for executing the job in a setting value file.

Returning to FIG. 2, the job history storage area 238 is a storage area in which a job execution record is stored as a job history. The job history according to the present disclosure will be described below. FIG. 4 is a table illustrating a configuration example of the data structure of the job history stored in the job history storage area 238.

The job history related to the example in FIG. 4 includes a job ID, execution date and time, a job type, a user name, and a status.

The job ID, the execution date and time, and the job type are the same items as and have the same contents as those contained in the setting history described in FIG. 3A. The user name indicates a name of a user who executed the job. The status indicates a processing status of the job.

For example, a job history for a job ID "0097" is a job history related to "fax" as the type of a job executed at 18:18 on Feb. 22, 2020. It is indicated that, for the job, an execution instruction is input by a user with a user name "aaaaa" and the status of the job is "Finished".

Unlike the setting history, the job history is information used for recording an execution history of a job, and therefore, can be generated immediately after the job has been completed or after the setting history has been generated.

Again, returning to FIG. 2, the prohibition setting storage area 239 is a storage area in which the prohibition setting table referred to by the controller 11 that has read the prohibition setting determination program 234 is stored. The prohibition setting table according to the present disclosure will be described below. FIG. 5 illustrates a configuration example of a data structure of the prohibition setting table stored in the prohibition setting storage area 239.

The prohibition setting table related to the example in FIG. 5 includes an authorized user, a target job, a prohibition setting (setting value), and a prohibition setting (setting history).

The authorized user indicates a user name with an authority to impose a prohibition setting on a setting history. The authorized user is a user who has been given the authority related to the prohibition setting by an administrator of the multifunctional machine 10.

The target job indicates a job type corresponding to the setting history on which the prohibition setting is imposed.

The prohibition setting (setting value) indicates a specific setting value at which the prohibition setting is imposed. The setting value on which the prohibition setting can be imposed is a setting value used for execution of a job and is a setting value that can be stored in the setting value file illustrated in FIG. 3B. The prohibition setting (setting value) can be set in a form of a summary of special functions, such as page aggregation, blank page skip, or the like, as in "Use of special functions", and setting values related to special functions can be set individually. In a case where the prohibition setting targets a specific setting value in the setting value file, the controller 11 can execute the job, based on the other setting values excluding the setting value on which the prohibition setting is imposed.

Prohibition settings (setting history) is a method of directly designating the setting history on which the prohibition setting is imposed. For example, FIG. 5 illustrates an example where the authorized user "aaaaa" imposes a prohibition setting on a setting history related to Scan to SMB. When the job using the setting history on which the prohibition setting is imposed by the authorized user is executed, the controller 11 can restrict execution of the job.

1.2 Process Flow

1.2.1 Flow of Generation of Setting History

Figure 6:
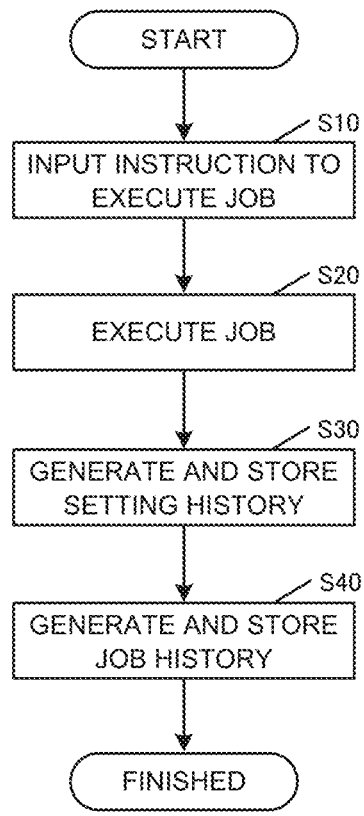
FIG. 6 is a flowchart illustrating a process flow according to the first embodiment.

Next, a process flow according to the first embodiment will be described. FIG. 6 is a flowchart roughly illustrating a process flow related to generation of a setting history by the multifunctional machine 10. The controller 11 generates the setting history by reading the job execution program 231, the setting history processing program 232, or the like.

The controller 11 receives an input of an instruction to execute a job via the setting screen related to copying, faxing, image transmission, or the like (Step S10). In this case, the user can input an instruction to execute the job after performing necessary settings using a setting history displayed via the home screen or the setting screen corresponding to each job type.

Upon receiving the input of the instruction to execute the job, the controller 11 executes the job (Step S20). As used herein, "execution of a job" means a series of processes executed under control of any one of job modes, such as copying, faxing, image transmission, or the like, during a period from reading of the setting history or input of the setting values to termination of an operation of the job that has been started upon receiving the input of the instruction to execute the job.

When the controller 11 executes a job, the controller 11 acquires setting values related to the executed job and generates a setting value file containing the setting values. The controller 11 then stores the generated setting value file in the setting value file storage area 236. The controller 11 also generates a setting history by linking the setting value file to identification information used for identifying to which job the setting value file is related. The controller 11 then stores the generated setting history in the setting history storage area 237 (Step S30).

The controller 11 uses the setting history generated in Step S30 to generate a job history as an execution history of the job, then, stores the job history in the job history storage area 238 (Step S40), and terminates the process.

Next, an overall process related to execution of a job using the setting history generated in FIG. 6 will be described with reference to a flowchart of FIG. 7. The process described below is executed by the controller 11 by reading the job execution program 231, the setting history processing program 232, the prohibition setting determination program 234, the display processing program 235, or the like. The following process will be described on assumption that a login authentication function is set effective.

The controller 11 executes a login process, based on a login operation by the user via the login screen (Step S100). The login process can be performed, for example, by storing a login user name and a login password in association in advance and collating and authenticating the login user name and login password entered via the login screen.

Authentication of the login user can be also performed by property authentication using a token, a key, an IC card, a smart phone, or the like, or biometric authentication, such as fingerprint authentication, face authentication, or the like, in addition to knowledge authentication using the login user name and the login password.

If login is successful, the controller 11 displays the home screen on the display 13 (Step S110; Yes→Step S120). On the other hand, if the login fails or the screen operation is not a login operation, the controller 11 continues to display the login screen (Step S110; No→Step S100).

The home screen is a basic screen on which selection buttons used for receiving an input of an instruction input to display each of screens related to a job setting screen, a setting history, a device setting, a device status, or the like are collected together. When an instruction to display the setting history is input via the home screen, the controller 11 displays a list of setting histories related to the job executed by a login user (Step S130; Yes→Step S140). If no instruction to display the setting history is input, the controller 11 continues to display the home screen (Step S130; No→Step S120).

In displaying the list of setting histories, the controller 11 displays the setting histories including a setting history on which a prohibition setting is imposed. By enabling display of the setting history on which the prohibition setting is imposed, the user can check a past operation history, and usability can be ensured. In this case, in order to distinguish between the setting history on which the prohibition setting is imposed and the setting history on which no prohibition setting is imposed, for example, a sign indicating that the prohibition setting is imposed can be given, or the setting history on which the prohibition setting is imposed can be displayed in a different display form (display color, display font, display size, or the like) from that of the setting history on which no prohibition setting is imposed. On the other hand, the setting history on which the prohibition setting is imposed can be set to be not displayable. Setting of whether to display the setting history on which the prohibition setting is imposed can be configured to be selectable by the user, for example, through user management, system setting, or the like.

Next, the controller 11 determines whether one setting history has been selected from the displayed list of setting histories (Step S150). When the controller 11 determines that one setting history has been selected, whether the selected setting history is a setting history related to a prohibition setting (Step S150; Yes→Step S160). If no setting history has been selected, the controller 11 continues to display the list of setting histories (Step S150; No→Step S140).

If the controller 11 determines that the selected setting history is a setting history related to a prohibition setting, the controller 11 determines that it is a job on which an execution restriction is imposed that is executed, and displays a setting screen used for the job on which the execution restriction is imposed (Step S160; Yes→Step S170). The process of determining whether the setting history is a setting history related to a prohibition setting will be described with reference to a next figure.

Upon receiving display of the setting screen used for the job on which the execution restriction is imposed, the user either cancels execution of the job or executes the job under a condition where the execution restriction is imposed (Step S180). For example, even when an execution restriction is imposed on execution of the job, the job can be executed if a consent of the administrator is obtained in some cases. In this case, the user can contact the administrator and release the execution restriction on the job, for example, by inputting a release code or the like issued by the administrator to an unillustrated release screen.

When the job is executed under the condition where the execution restriction is imposed, the controller 11 generates and stores a setting history based on execution of the job (Step S190) and terminates the process.

Incidentally, if the controller 11 determines that the selected setting history is not a setting history related to a prohibition setting, the controller 11 determines that it is a normal job on which no execution restriction is imposed that is executed and displays a setting screen of the job (Step S160; No→Step S200).

Then, when the user inputs an instruction to execute the job, the controller 11 executes the job (Step S210).

When the controller 11 executes the job, the controller 11 generates and stores a setting history based on execution of the job (Step S190) and terminates the process.

Next, a prohibition setting determination process pertaining to Step S160 of FIG. 7 will be described with reference to a flowchart of FIG. 8.

The controller 11 that has read the prohibition setting determination program 234 refers to the prohibition setting table (see FIG. 5) stored in the prohibition setting storage area 239 and determines whether a prohibition setting is imposed on the setting history selected by the user (Step S1610).

If the controller 11 determines that a prohibition setting is imposed on the setting history; the controller 11 determines that the setting history is a setting history related to the prohibition setting and terminates the process (Step S1610; Yes→Step S1650).

On the other hand, if the controller 11 determines that no prohibition setting is imposed on the setting history itself, the controller 11 reads a setting value from the setting value file of the setting history (Step S1610; No→Step S1620).

The controller 11 refers to the prohibition setting table and determines whether a prohibition setting is imposed on the read setting value (Step S1630).

If the controller 11 determines that a prohibition setting is imposed on the read setting value, the controller 11 determines whether all setting values have been read (Step S1630; Yes→Step S1640). On the other hand, if the controller 11 determines that no prohibition setting is imposed on the read setting value, the controller 11 reads a next setting value (Step S1630; No→Step S1620).

If the controller 11 determines that reading of setting values has been completed, the controller 11 determines that the setting history is a setting history related to a prohibition setting and terminates the process (Step S1640; Yes→Step S1650). On the other hand, if the controller 11 determines that reacting of all setting values has not been completed, the controller 11 reacts a next setting value (Step S1640; No→Step S1620).

1.3 Operation Example

Figure 9:
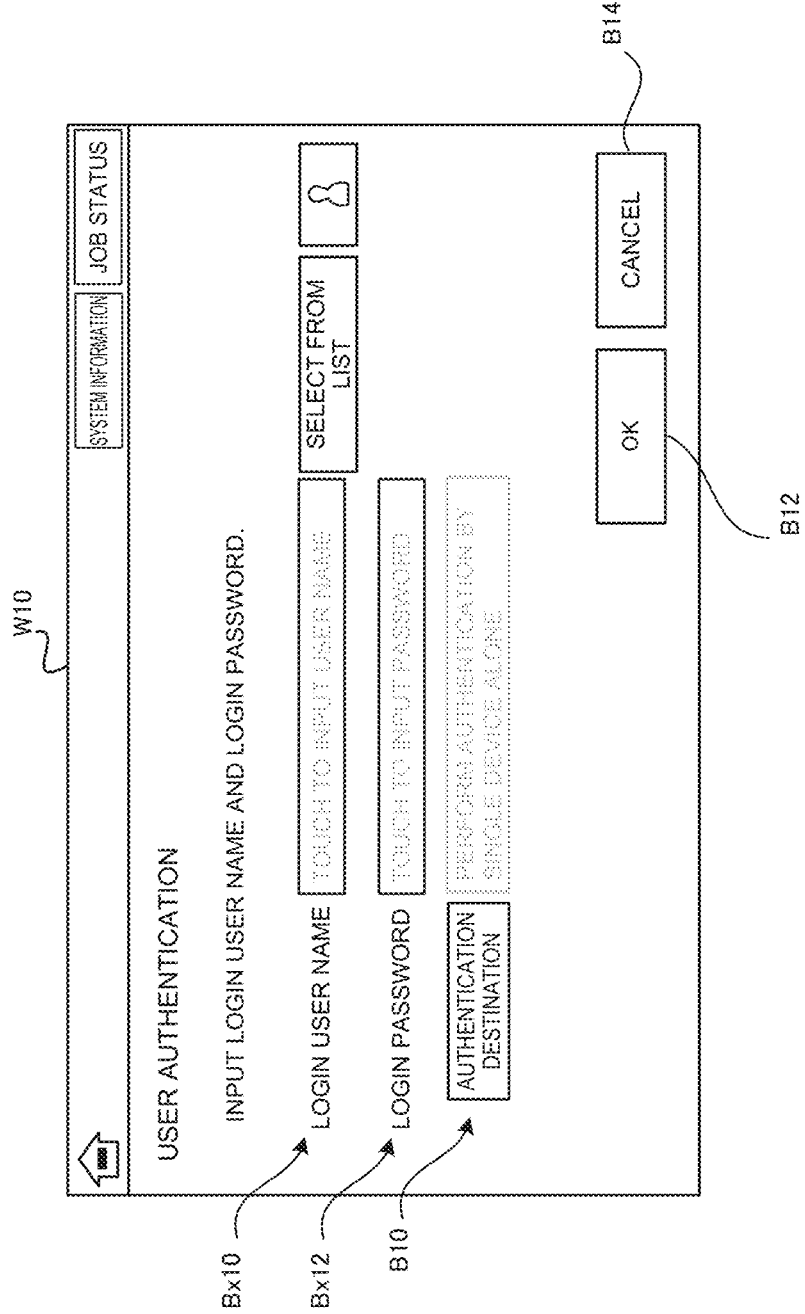
FIG. 9 is a view illustrating an operation example according to the first embodiment.

Next, an operation example according to the first embodiment will be described. FIG. 9 is a view illustrating a configuration example of the login screen (authentication screen) displayed by the controller 11. This operation is an operation example corresponding to a process of Step S100 of FIG. 7.

A login screen W10 includes a login user name input box Bx10, a login password input box Bx12, an authentication destination selection button B10, an OK button B12, and a cancel button B14.

The login user name input box Bx10 is an input box that receives an input of a login user name of a login user who requests login to the multifunctional machine 10.

The login password input box Bx12 is an input box that receives an input of a login password associated with the login user name of the login user who requests login to the multifunctional machine 10.

The authentication destination selection button B10 receives selection of an authentication destination of the login user. In the example in FIG. 9, a single device (the multifunctional machine 10) is selected as the authentication destination of the login user. In a case where a login user is managed by another device, such as a management server, via a network (NW), a name of the other device and location information of the other device on the network (for example, an IP address, or the like) can be selected.

The OK button B12 is a button that receives a login authentication operation by the login user. The cancel button B14 is a button that receives cancellation of the login authentication operation by the login user.

Figure 10:
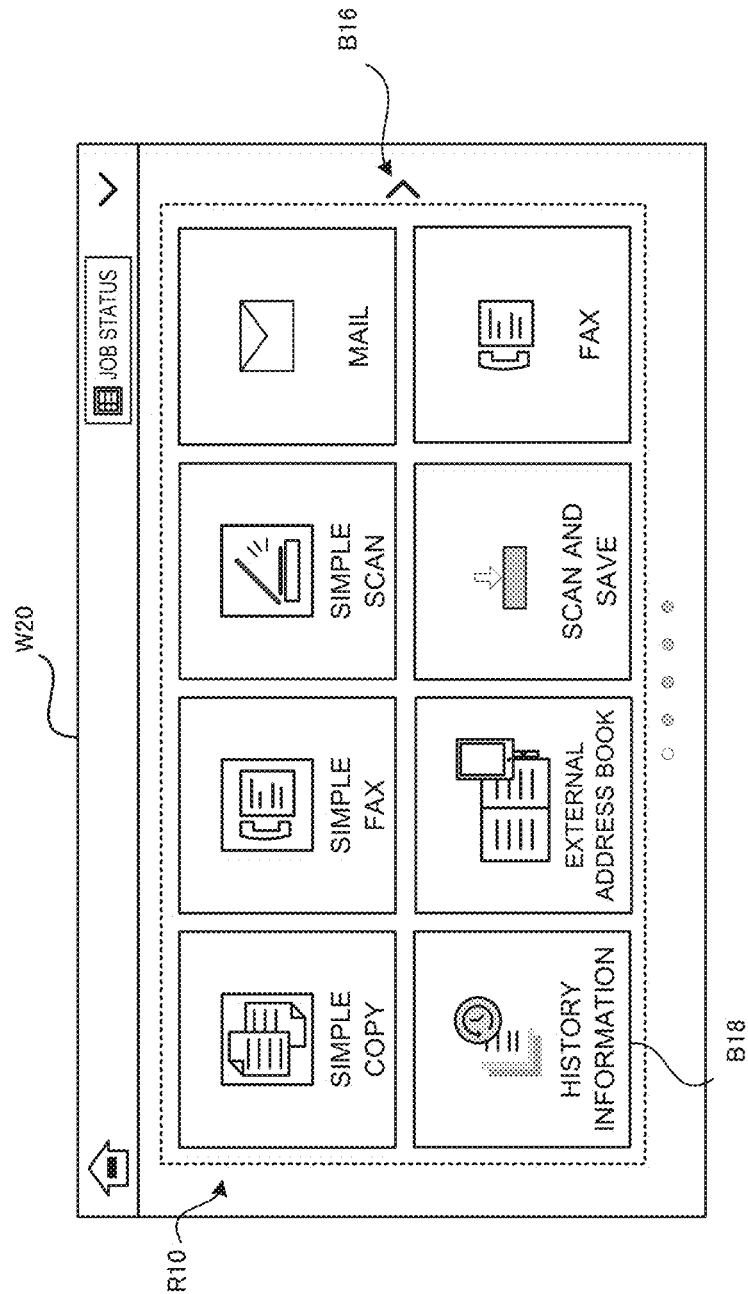
FIG. 10 is a view illustrating an operation example according to the first embodiment.

FIG. 10 is a view illustrating a configuration example of a home screen W20 displayed by the controller 11 when login is successful. This operation is an operation example corresponding to a process of Step S120 of FIG. 7.

The home screen W20 includes a job function and the like display area R10 and a job function and the like display area switching button B16.

The job function and the like display area R10 is an area in which a collection of job function or the like selection buttons used for selecting each job function, receiving an instruction to display setting history information, or the like is displayed. The job function and the like selection button is a selection button with a screen structure that illustrates each job function, information, or the like in a form of graphics, letters and numbers, or symbols.

The job function and the like display area R10 illustrated in FIG. 10 is an example of a job function and the like display area including job function or the like selection buttons, such as a simple copy button, a simple fax button, a simple scan button, a mail button, a history information button B18, an external address book button, a scan save button, a fax button, or the like as job functions, used for selecting each job function and receiving an input of an instruction to display a setting history.

The job function and the like display area switching button B16 receives an input of an instruction by the user in switching display contents of the job function and the like display area R10. Upon receiving an input of an instruction to the job function and the like display area switching button B16 by the user, the controller 11 can switch the display contents of the job function and the like display area R10 by switching the job function and the like selection button.

Figure 11:
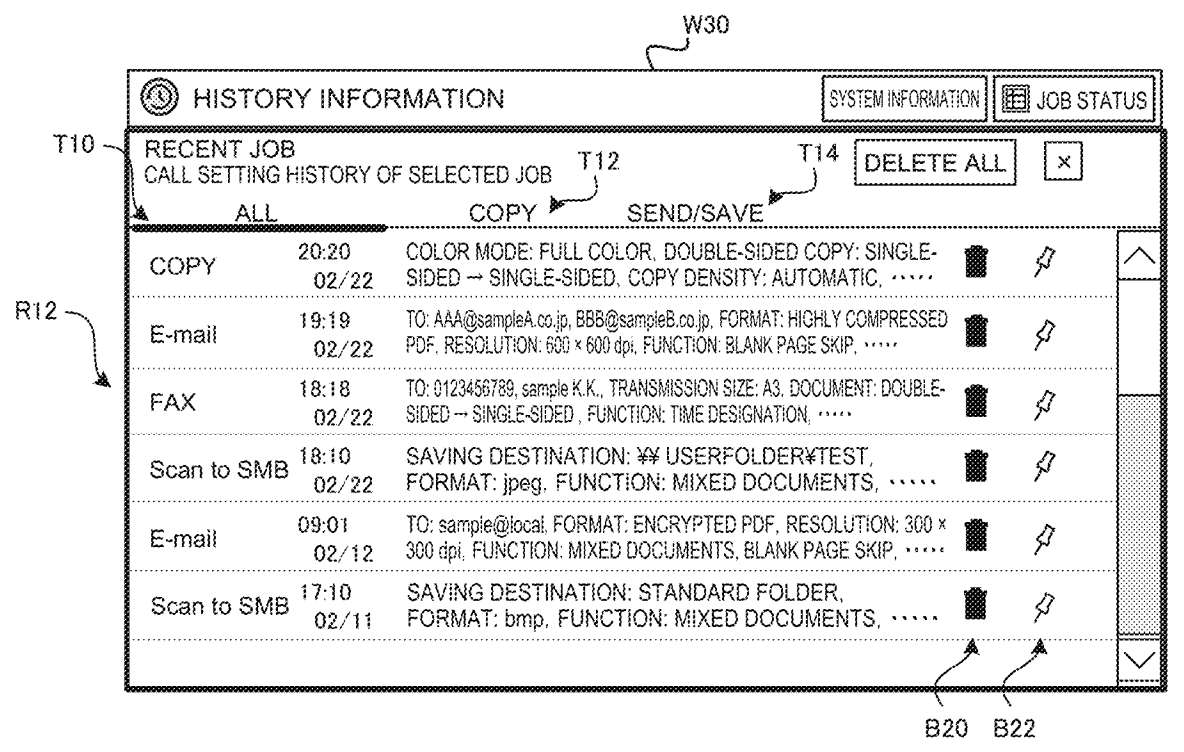

FIG. 11 is a view illustrating a configuration example of a setting history display screen W30 displayed by the controller 11 upon receiving an input of the history information button B18 of the home screen W20. This operation is an operation example corresponding to a process of Step S140 of FIG. 7.

The setting history display screen W30 includes a setting history display area R12. The setting history display area R12 is a display area in which a setting history corresponding to each job executed by the user is displayed. The setting history display area R12 includes an all tab T10, a copy tab T12, and a send/save tab T14, a delete button B20, and a pinning button B22.

The all tab T10, the copy tab T12, and the send/save tab T14 are tabs used for filter-processing a setting history to be displayed in accordance with a job type thereof and then displaying the setting history. FIG. 11 illustrates an example where setting history related to all jobs executed by the user "aaaaa" (see FIGS. 3A and 3B and FIG. 4) is displayed. A bold underline indicating that the tab is selected is displayed below the selected tab.

The delete button B20 is a button that receives an instruction to delete the displayed setting history. When the controller 11 receives an input of the delete button B20, the controller 11 deletes the setting history from the setting history storage area 237.

The pinning button B22 is a button that receives an input of an instruction to fix display of the setting history in the setting history display area R12. When the controller 11 receives an input of an instruction by pressing the pinning button B22, the controller 11 fixes display of the setting history in the setting history display area R12.

In the setting history display area R12, the job type, the job execution date and time, and values of the display setting value are displayed as the setting history of each job. For example, the setting history displayed in the top row of the display area is a display example of a setting history related to a copy job executed by the user "aaaaa" at 20:20 on Feb. 22 (2020).

Incidentally, in the first embodiment, it is possible to simultaneously display both types of a setting history on which a prohibition setting is imposed and a setting history on which no prohibition setting is imposed. For example, in the setting history related to E-mail transmission executed by the user "aaaaa" at 19:19 on Feb. 22 (2020), as illustrated in FIG. 5, as a prohibition setting (setting value), a prohibition setting is imposed on a transmission destination address related to a transmission destination address "AAA@sampleA.co.jp". However, in the first embodiment, the setting history on which the prohibition setting is imposed is displayed. Thus, the user can check a past operation history; and usability can be ensured.

Figure 12:
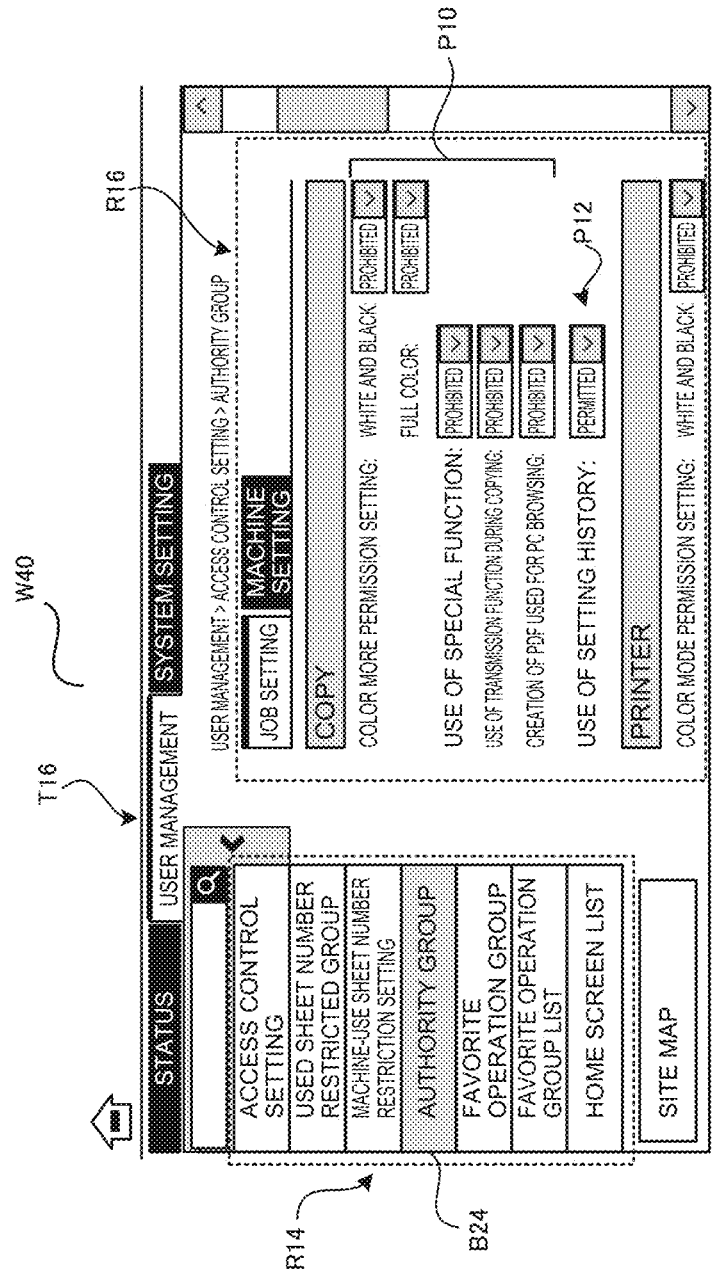
FIG. 12 a view illustrating an operation example according to the first embodiment.

FIG. 12 is a view illustrating a configuration example of the prohibition setting screen W40 that is displayed by the controller 11 by reading the prohibition setting program 233 or the like.

In FIG. 12, a configuration example in which a management function selection area R14 and a prohibition setting display area R16 are provided on a user management tab screen T16 will be described. The user management tab screen T16 is a screen that receives a setting related to management of the multifunctional machine 10 by the user. The management function selection area R14 is a display area in which a menu for management functions that can be set on the user management tab screen T16 is displayed. The user can cause the prohibition setting display area R16 to be displayed by inputting an instruction by pressing an authority group button B24 provided in the management function selection area R14.

The prohibition setting display area R16 includes a setting value prohibition setting pulldown P10 used for imposing a prohibition setting on a specific setting value and a setting history prohibition setting pulldown P12 used for imposing a prohibition setting on a setting history itself.

FIG. 12 illustrates, as specific setting values that, can be set via the setting value prohibition setting pulldown P10, setting values related to a copy job, such as "a color mode permission setting (black and white, full color)", "use of a special function", "use of transmission function during copying", "creation of PDF used for PC browsing", or the like, but the specific setting values that can be set are not limited thereto. The specific setting value on which a prohibition setting can be imposed can be changed or set as appropriate. In the setting value prohibition setting pulldown P10, either one of values of "permitted" and "prohibited" can be selected. According to the present disclosure, the specific setting value for which "prohibited" is selected in the setting value prohibition setting pulldown P10 is a (specific) setting value on which a prohibition setting is imposed.

In the setting history prohibition setting pulldown P12, a prohibition setting can be imposed on a setting history itself by selecting "prohibited". It is possible to impose a prohibition setting on the setting history itself using the setting history prohibition setting pulldown P12, and as illustrated in the example in FIG. 12, in a case where all of the specific setting values that can be set via the setting value prohibition setting pulldown P10 are set "prohibited", it is also possible to treat the setting history itself as a setting history on which a prohibition setting is imposed. The prohibition setting imposed via the prohibition setting screen W40 is stored in the prohibition setting table illustrated in FIG. 5.

Figure 13A:
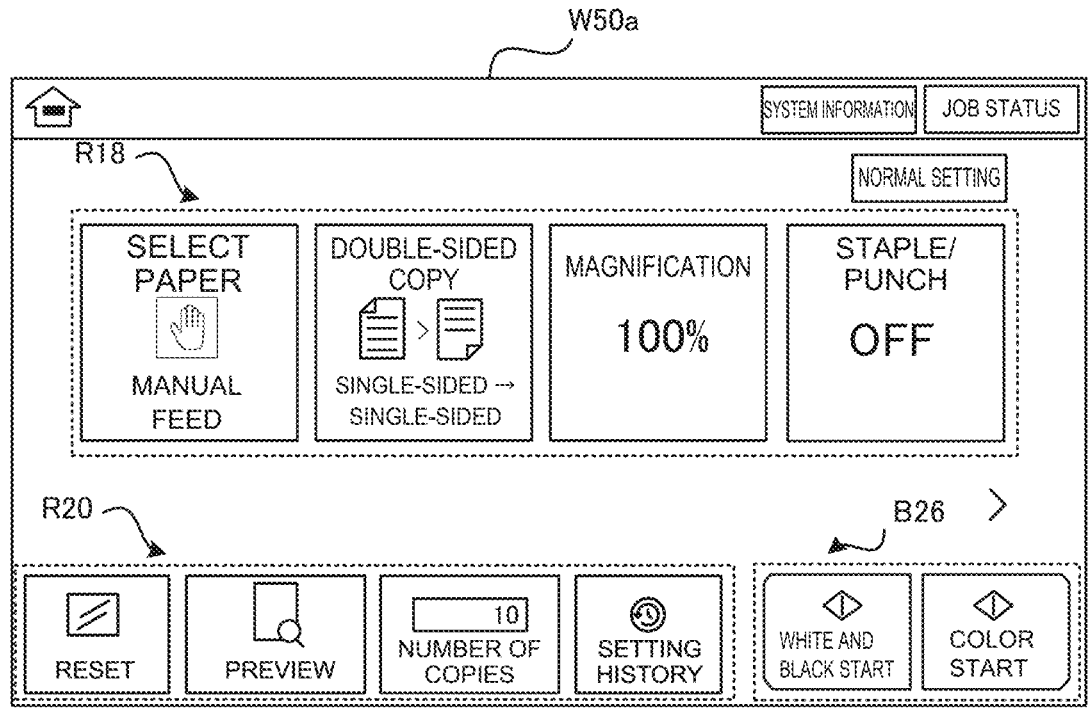
FIGS. 13A and 13B are views each illustrating an operation example according to the first embodiment.
Figure 13B:
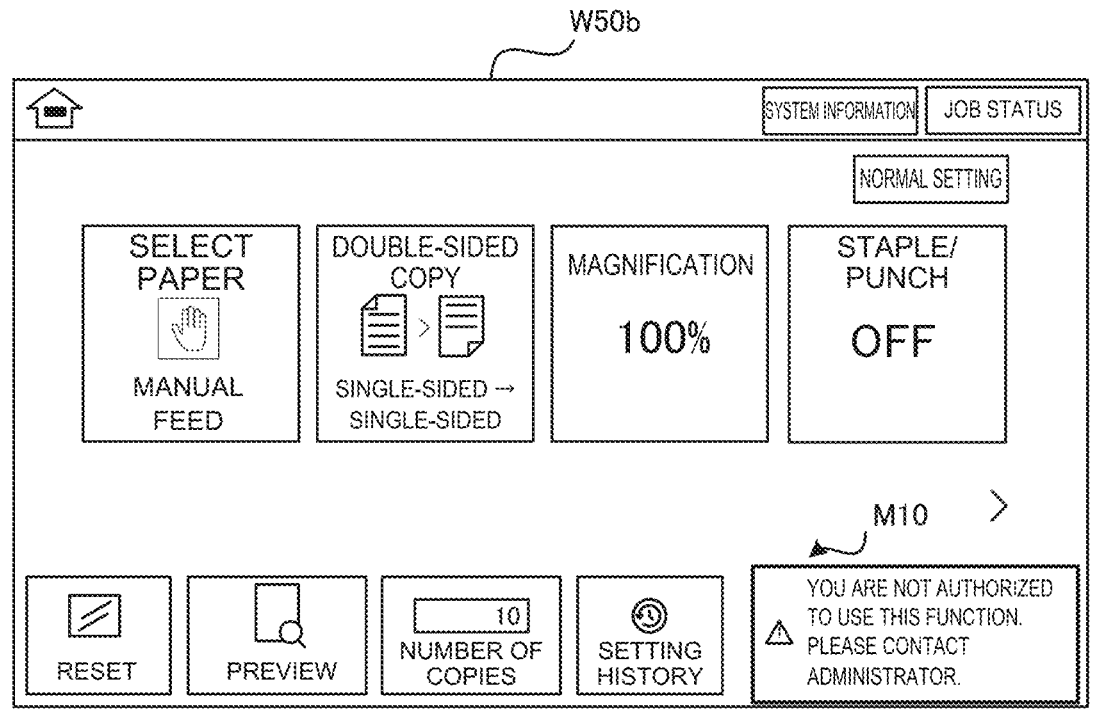

FIGS. 13A and 13B are views each illustrating a configuration example of the job setting screen displayed by the controller 11 in accordance with presence or absence of a prohibition setting imposed on a setting history. FIG. 13A is a view illustrating a configuration example of a simple copy setting screen displayed by the controller 11 when it is determined that it is a normal job on which no execution restriction is imposed that is executed in Step S160 of FIG. 7. FIG. 13B is a view illustrating a configuration example of the simple copy setting screen displayed by the controller 11 if it is determined that it is a job on which an execution restriction is imposed that is executed in Step S160 of FIG. 7.

A simple copy setting screen W50a illustrated in FIG. 13A includes a first function setting area R18, a second function setting area R20, and a start button B26.

The first function setting area R18 and the second function setting area R20 include setting buttons that receive selection and change of setting values related to execution of simple copy. For example, in the first function setting area R18, a setting button that is relatively highly likely to be changed during execution of simple copy can be provided. FIG. 13A illustrates an example of a case where, as setting buttons, a paper selection button, a double-sided copy button, a magnification button, and a staple/punch button are provided. The setting buttons are displayed such that the setting buttons reflect the values of the setting values set in the setting history (setting value file).

The start button B26 is an input button that receives an input of instruction to execute simple copy. The user can input an instruction to execute simple copy by pressing either one of start buttons of a white and black start or a color start included in the start button B26.

A simple copy setting screen W50b illustrated in FIG. 13B has a same configuration as that of the simple copy setting screen W50a. However, since a prohibition setting is imposed on a setting history related to the simple copy, the controller 11 superimposes a message screen M10 that restricts execution of the simple copy on a display position of the start button B26 and thus displays the superimposed message screen M10.

Display contents of the message screen M10 are not particularly restricted and, for example, a message that encourages the user to contact with the administrator and says "You are not authorized to use this function. Please contact with the administrator." or the like can be displayed. The message screen M10 can be also configured as an input button. In this case, it is also possible to display, for example, a contact information of the administrator, a contact method, or the like and to provide a message or a contact tool that makes it easier to contact the administrator in response an input of an instruction associated with pressing the message screen M10.

Figure 14A:
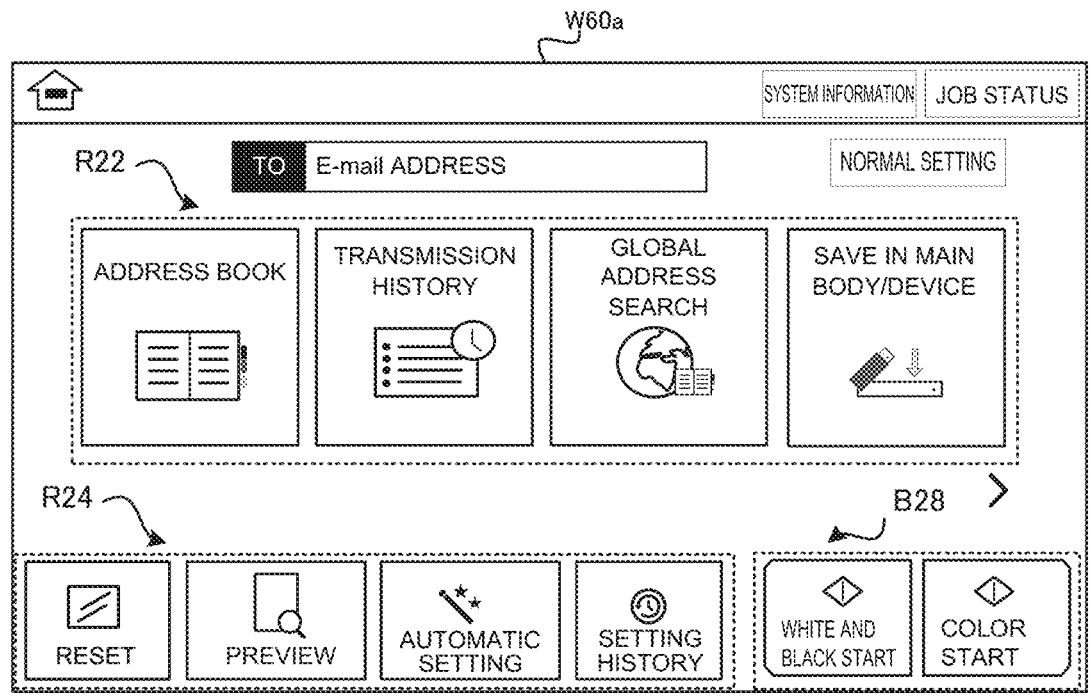
FIGS. 14A and 14B are views each illustrating an operation example according to the first embodiment.
Figure 14B:
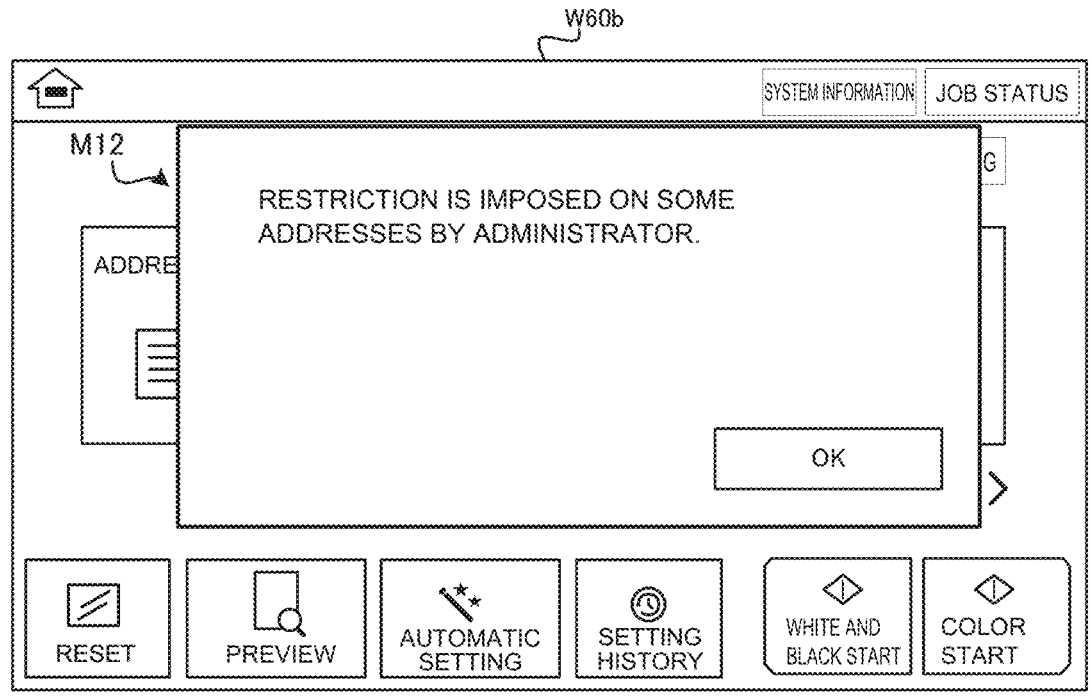

FIGS. 14A and 14B are views each illustrating a configuration example of the job setting screen displayed by the controller 11 in accordance with presence or absence of a prohibition setting imposed on a setting history (some of setting values). FIG. 14A a view illustrating a configuration example of a simple scan setting screen displayed by the controller 11 if it is determined that it is a normal job on which no execution restriction is not imposed that is executed in Step S160 of FIG. 7. FIG. 14B is a view illustrating a configuration example of the simple scan setting screen displayed by the controller 11 if it is determined that it is a job on which an execution restriction is imposed that is executed in Step S160 of FIG. 7.

A simple scan setting screen W60a illustrated in FIG. 14A includes a first function setting area R22, a second function setting area R24, and a start button B28.

The first function setting area R22 and the second function setting area R24 include setting buttons that receive selection and change of setting values related to execution of simple scan. For example, a setting button that is relatively highly likely to be changed during execution of simple scan can be provided in the first function setting area R22. FIG. 14A illustrates an example of a case where, as the setting buttons, an address book button, a transmission history button, a global address search button, and a save in main body/device button are provided.

The start button B28 is an input button that receives an input of an instruction to execute simple scan. The user can input an instruction to execute simple scan by pressing either one of start buttons of a white and black start or a color start included in the start button B28.

A simple scan setting screen W60b illustrated in FIG. 14B has a same configuration as that of the simple scan setting screen W60a. However, since a prohibition setting is imposed on the setting history (some of setting values) related to the simple scan, the controller 11 superimposes a message screen M12 that restricts execution of a job related to some of setting values of the simple scan on a display position of the first function setting area R22 and thus displays the superimposed message screen M12.

Display contents of the message screen M12 are not particularly restricted and, for example, contents informing that restrictions are imposed on some of the setting values (transmission destination addresses) by the administrator and saying "Restrictions are imposed on some of transmission destination addresses by the administrator." or the like can be displayed. The message screen M12 can be also configured as an input button. In this case, it is also possible to display, for example, contact information of the administrator, a contact method, or the like and to provide a message or a contact tool that makes it easier to contact the administrator in response an input of an instruction associated with pressing the message screen M12.

As has been described above, according to the first embodiment, the user can check a past operation history by displaying setting histories that include a setting history on which prohibition setting is imposed, and usability can be ensured. Moreover, because an execution restriction is imposed on a job based on a setting history on which a prohibition setting is imposed, erroneous use and unauthorized use of the setting history can be prevented.

2 Second Embodiment

According to a second embodiment, a job related to a setting history is executed using other setting values excluding a specific setting value on which a prohibition setting is imposed. In the second embodiment, a mode in which a prohibition setting is imposed on a transmission destination address (transmission destination address) related to image transmission, faxing, or the like, as a specific setting value will be described.

2.1 Functional Configuration

A functional configuration of a multifunctional machine according to the second embodiment can be same as that of the multifunctional machine 10 according to the first embodiment, and therefore, the description thereof will be omitted herein.

2.2 Process Flow

An overall process according to the second embodiment will be described with reference to a flowchart in FIG. 15. The process described here is related to image transmission and is executed by the controller 11 by reacting the job execution program 231, the setting history processing program 232, the prohibition setting determination program 234, the display processing program 235, or the like. The following process will be described on assumption that a login authentication function is set effective. For same processes as those described in FIG. 7 will be denoted by same step numbers given to those described in FIG. 7.

Figure 7:
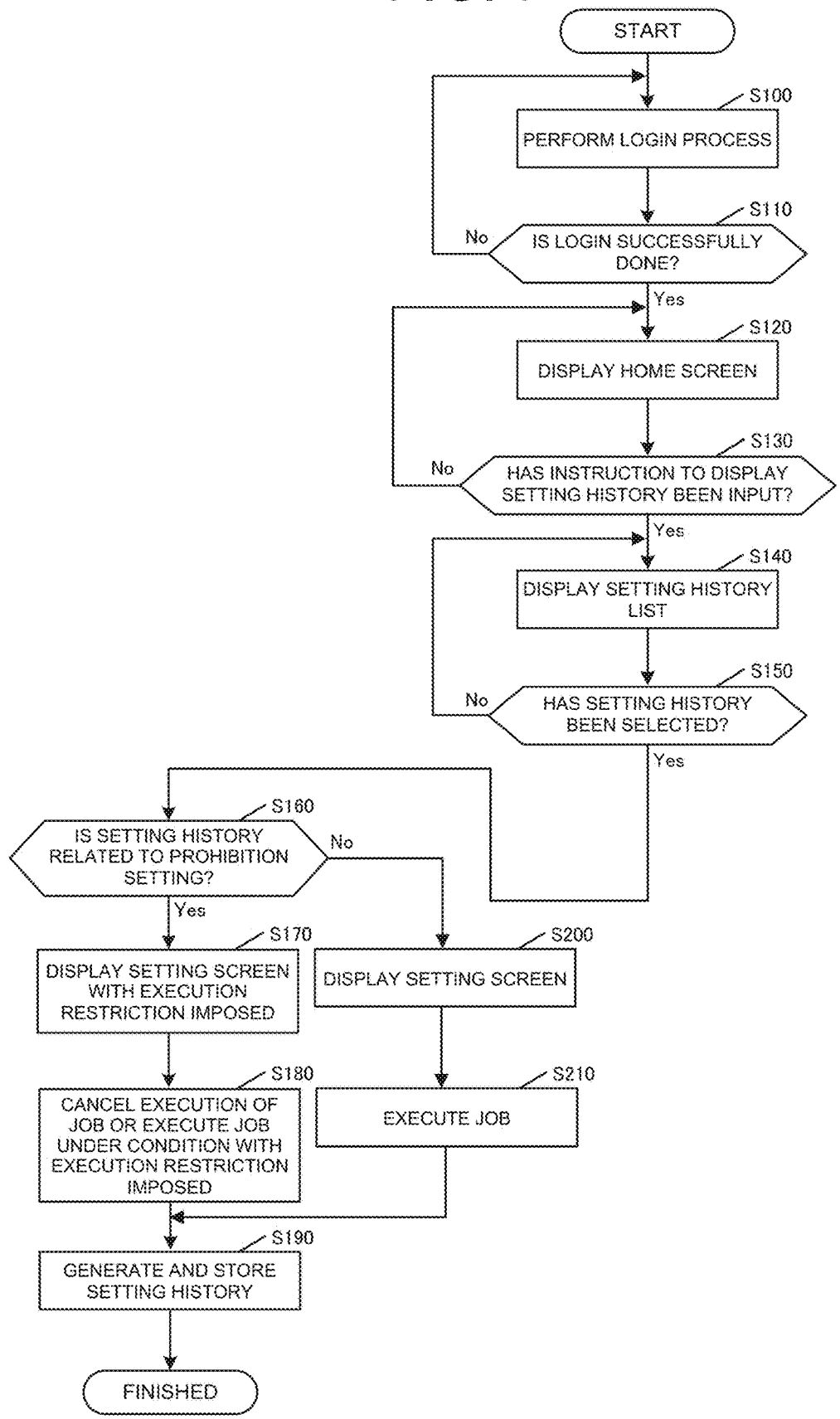
FIG. 7 is a flowchart illustrating a process flow according to the first embodiment.
Figure 8:
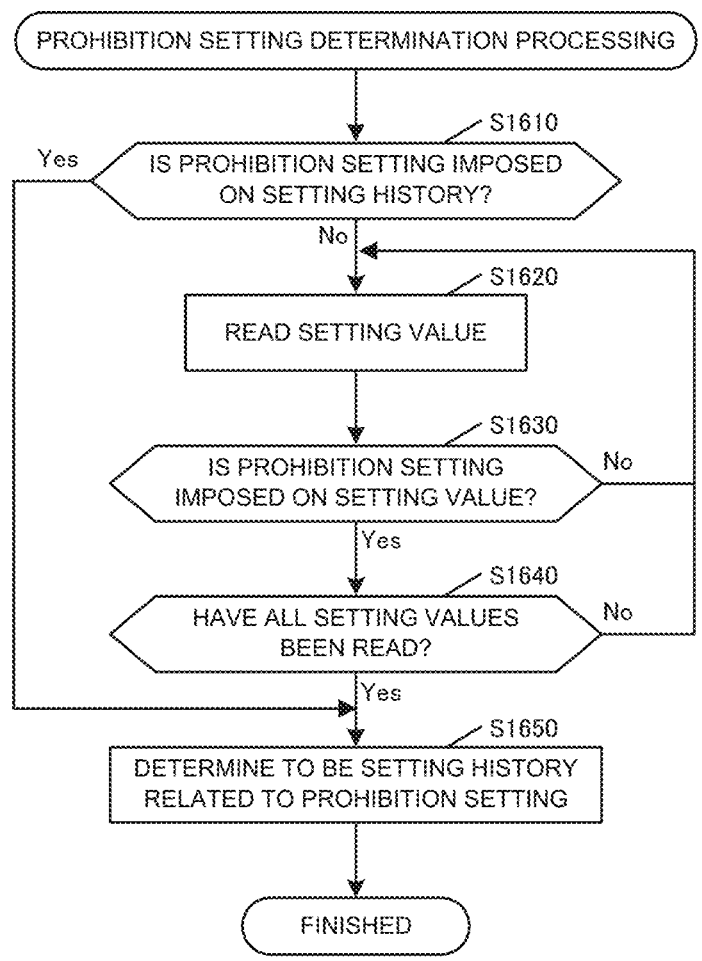
FIG. 8 is a flowchart illustrating a process flow according to the first embodiment.

A process pertaining to Step S100 to Step S140 in the second embodiment can be same as the process pertaining to Step S100 to Step S140 described in FIG. 7. Therefore, it is assumed that the process of Step S100 to Step S140 have been executed, and a process from Step S150 onward will be described.

The controller 11 determines whether one setting history is selected from a displayed list of setting histories (Step S150). If the controller 11 determines that one setting history has been selected, the controller 11 determines whether the selected setting history is a job related to image transmission (Step S150; Yes→Step S220) if no setting history has been selected, the controller 11 continues to display the list of setting histories (Step S150; No→Step S140).

If the controller 11 determines that the selected setting history is a job related to image transmission, the controller 11 determines whether the setting history includes a transmission destination address as a prohibition setting (Step S220; Yes→Step S230). The controller 11 determines whether the setting history includes a transmission destination address as a prohibition setting by referring to prohibition settings (setting values) in a prohibition setting table.

If the controller 11 determines that the setting history includes a transmission destination address as a prohibition setting, the controller 11 determines that it is a job on which an execution restriction is imposed that is executed. Then, the controller 11 determines whether there is only one such transmission destination address (Step S230; Yes→Step S240).

If the controller 11 determines that there is not only one transmission destination address related to the prohibition setting, the controller 11 causes transmission destination addresses excluding transmission destination addresses related to the prohibition setting to be displayed on an image transmission setting screen (Step S240; No→Step S250).

Next, upon receiving an input of an instruction to execute the job by the user, the controller 11 transmits image data to the transmission destination addresses excluding the transmission destination addresses related to the prohibition setting (Step S260).

When the controller 11 executes the job, the controller 11 generates and stores a setting history based on execution of the job (Step S190) and terminates the process. For example, for generation and storage of a setting history, it is possible to use an input of an instruction to execute a job as a trigger to start a process, and an execution timing of generation and storage of the setting history is not limited to that described herein.

On the other hand, if the controller 11 determines that there is only one transmission destination address related to the prohibition setting, there is no longer a transmission destination of the image data in fact, and therefore, the controller 11 displays a setting screen of a job on which an execution restriction is imposed (Step S240; Yes→Step S170).

When the setting screen of a job on which an execution restriction is imposed is displayed, the user either cancels execution of the job or executes the job under a condition where an execution restriction is imposed. For example, even when an execution restriction is imposed on execution of the job, the job can be executed if a consent of the administrator is obtained in some cases. In this case, the user can contact the administrator and release the execution restriction on the job by inputting a release code or the like issued by the administrator to an unillustrated release screen.

When the job is executed under the condition where the execution restriction is imposed, the controller 11 generates and stores a setting history based on execution of the job (Step S190) and terminates the process. For example, for generation and storage of a setting history, it is possible to use an input of an instruction to execute a job as a trigger to start a process, and an execution timing of generation and storage of the setting history is not limited to that described herein.

Incidentally, if the controller 11 determines that the setting history includes no transmission destination address as a prohibition setting, the controller 11 determines that it is a normal job on which no execution restriction is imposed that is executed and displays the setting screen of the job (Step S230; No→Step S200).

Then, when an instruction to execute the job is input ley the user, the controller 11 executes the job by transmitting the image data (Step S280).

When the controller 11 executes the job, the controller 11 generates and stores a setting history based on execution of the job (Step S190) and terminates the process. For example, for generation and storage of a setting history, it is possible to use an input of an instruction to execute a job as a trigger to start a process, and an execution timing of generation and storage of the setting history is not limited to that described herein.

If it is determined in Step S220 that the setting history selected by the user is not a job related to image transmission, job setting screens of jobs other than an image transmission job are displayed and an input of an instruction to execute a job is received (Step S220; No→Step S270).

Then, when the instruction to execute the job is input by the user, the controller 11 executes the job by transmitting image data (Step S210).

When the controller 11 executes the job, the controller 11 generates and stores a setting history based on execution of the job (Step S190) and terminates the process. For example, for generation and storage of a setting history, it is possible to use an input of an instruction to execute a job as a trigger to start a process, and an execution timing of generation and storage of the setting history is not limited to that described herein.

2.3 Operation Example

Figure 16:
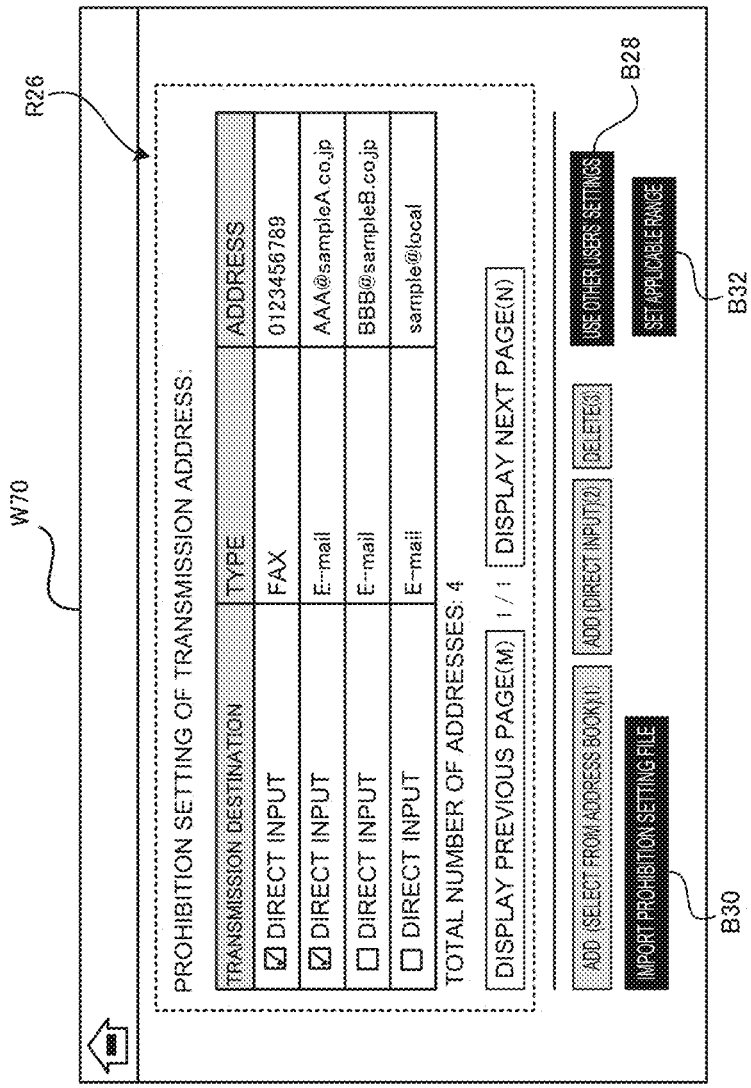
FIG. 16 is a view illustrating an operation example according to the second embodiment.

Next, an operation example according to the second embodiment will be described. FIG. 16 is a view illustrating a configuration of a prohibition setting value designation screen W70 as an input screen displayed when the controller 11 reads the prohibition setting program 233. Designation of a specific setting value via the prohibition setting value designation screen W70 can be performed, for example, at a timing of generation of a setting history before or after execution of a job using the setting history, but is not limited thereto. The user may manually designate a specific setting value on which a prohibition restriction is imposed at any time, as appropriate.

The prohibition setting value designation screen W70 includes a prohibition setting value designation area R26, a button B28 used for referring to other users' settings, an import button B30 used for importing a prohibition setting file, and an applicable range setting button B32.

The prohibition setting value designation area R26 receives manual designation of the transmission destination (transmission destination address) as a specific setting value on which a prohibition setting is imposed. The user can pose a prohibition setting on the displayed transmission destination address by checking a check box of a transmission destination name. FIG. 16 illustrates an example of a case illustrated in FIG. 11 where a prohibition setting is imposed on a transmission destination address set as a transmission destination in an E-mail transmission job or a fax job executed by the user "aaaaa". FIG. 16 illustrates a view in which a prohibition setting is imposed on a transmission destination address "0123456789" related to the fax job and a transmission destination address "AAA@sampleA.co.jp" related to an E-mail job.

In this case, the transmission destination address can be designated by directly inputting the transmission destination address, as illustrated in the example in FIG. 16, or can be selected from an address book managed by the multifunctional machine 10 or an address book obtained from another device. In a case where the transmission destination address is directly input, a regular expression designation (for example, a domain destination of *@sample.co.jp, or the like) can be also designated.

Designation of a specific setting value on which a prohibition setting is imposed can be also performed by referring to other users' settings in accordance with an instruction input by pressing the button B28 used for referring to other users' settings.

Designation of a specific setting value on which a prohibition setting is imposed can be also automatically performed based on an input of an instruction by pressing the import button B30 used for importing a prohibition setting file. For example, a list of specific setting values on which prohibition settings are imposed can be created in an XML format that can be discriminated by the multifunctional machine 10 and then can be imported to the multifunctional machine 10.

For example, FIG. 17 is a view illustrating a configuration of an imported file in which the transmission destination address "AAA@sampleA.co.jp" related to an E-mail transmission job and the transmission destination address "0123456789" related to a fax job are written in the XML format. The user can set prohibition settings imposed on a plurality of transmission destination addresses at a time by writing a list of specific settings on which prohibition settings are imposed in the XML format, as illustrated in the example in FIG. 17, and importing the list to the multifunctional machine 10.

Incidentally it is also possible to designate a range of setting histories to which a prohibition setting is applied via the prohibition setting value designation screen W70. In response to an input of a designation instruction by the user by pressing the applicable range setting button B32, the controller 11 displays an applicable range designation screen W80 illustrated in FIG. 18.

Figure 18:
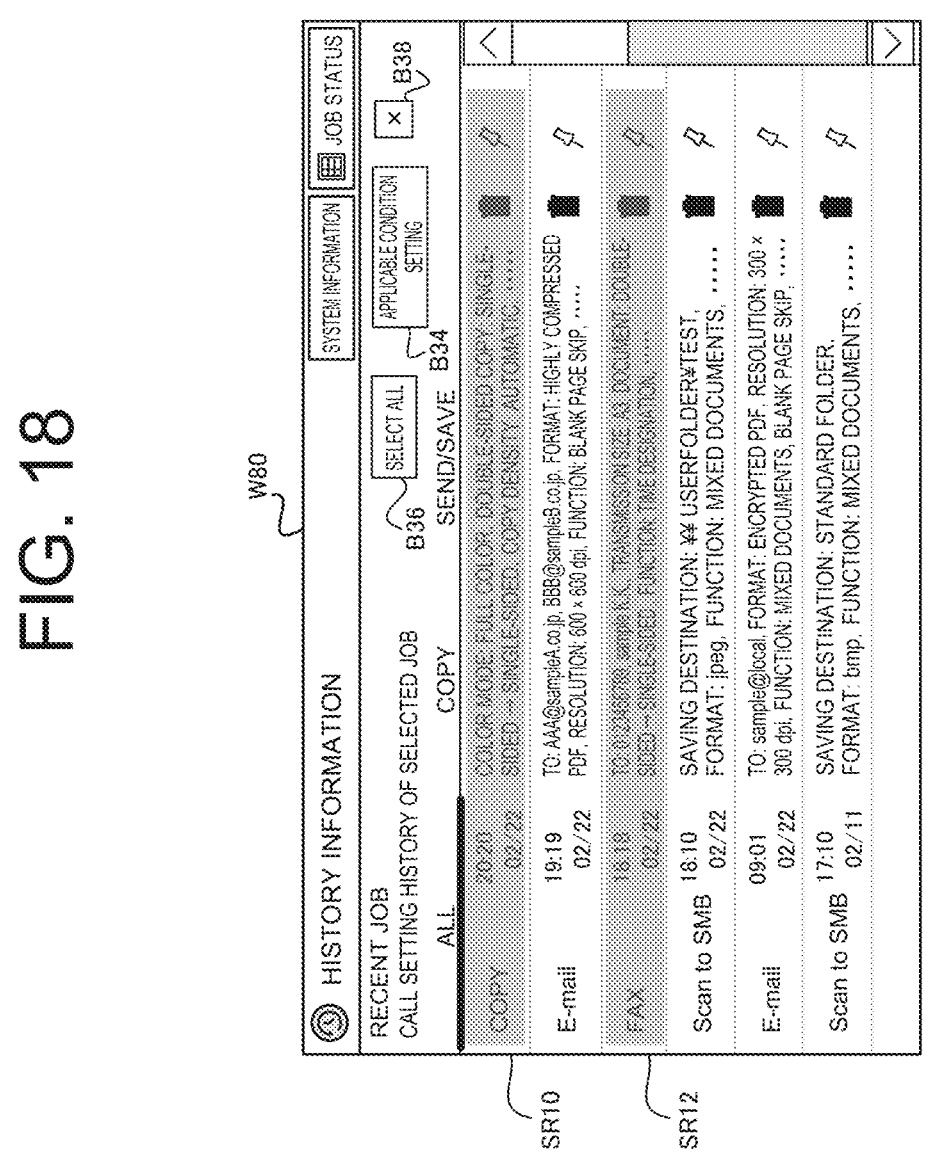

FIG. 18 is a view illustrating a configuration example of the applicable range designation screen W80 displayed by the controller 11. The applicable range designation screen W80 has a configuration in which an applicable condition setting button B34, an all selection button B36, and a close button B38 are provided in the setting history display screen W30 illustrated in FIG. 11.

The user can designate a setting history on which a prohibition setting is imposed by selecting each setting history displayed on the applicable range designation screen W80. FIG. 18 illustrates an example in which a setting history SR10 and a setting history SR12 are selected and designated. The designated setting history SR10 and setting history SR12 are displayed in a predetermined display color as illustrated in FIG. 18.

The applicable condition setting button B34 is a setting button that receives a condition setting of a setting history on which a prohibition setting (for example, a setting history related to a job before setting date and time, a setting history with the job type restricted, or the like).

The all selection button B36 is a setting button that receives an instruction for setting given by the user in a case where a prohibition setting is imposed on all setting histories displayed in the setting history display area.

The close button B38 is a registration button that receives registration of designation of a prohibition setting via the applicable range designation screen W80. Upon receiving an input of an instruction for registration in response to pressing of the close button B38, the controller 11 stores these setting contents in the prohibition setting table and terminates display of the applicable range designation screen W80.

Figure 19A:
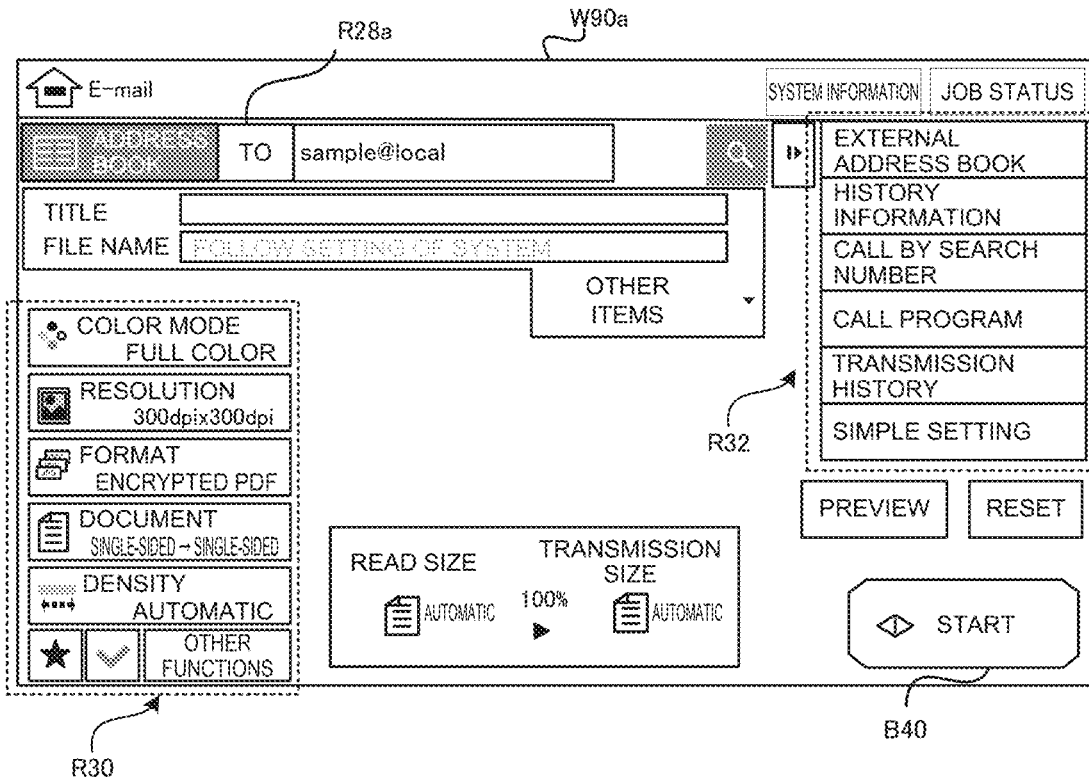
FIGS. 19A and 19B are views each illustrating an operation example according to the second embodiment.
Figure 19B:
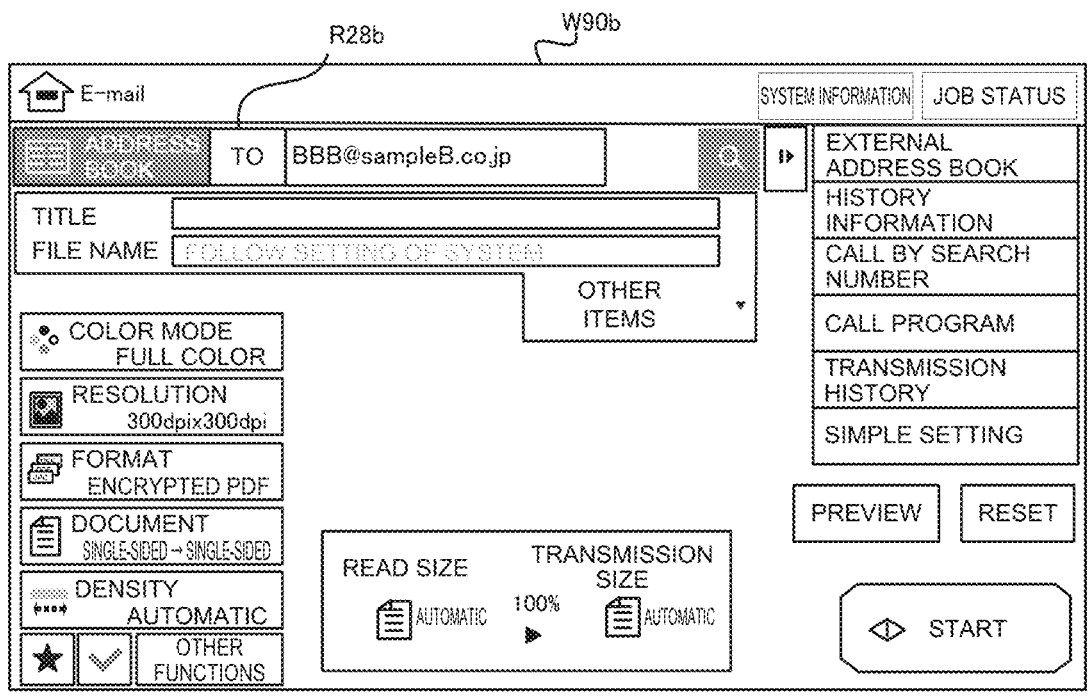

FIGS. 19A and 19B are views each illustrating a configuration example of a job setting screen displayed by the controller 11 in accordance with presence or absence of a prohibition setting imposed on the setting history. FIG. 19A is a view illustrating a configuration example of an E-mail setting screen displayed by the controller 11 when it is determined that it is a normal job on which no execution restriction is imposed that is executed in Step S160 of FIG. 15. FIG. 19B is a view illustrating a configuration example of the E-mail setting screen displayed by the controller 11 when it is determined that it is a job on which an execution restriction is imposed that is executed in Step S160 of FIG. 15.

An E-mail setting screen W90a illustrated in FIG. 19A includes a transmission destination display area R28a, a setting value button display area R30, an operation control button display area R32, and a start button B40.

The transmission destination display area R28a is a display area in which a transmission destination address as a transmission destination related to E-mail transmission is displayed. For example, in a case where the E-mail setting screen illustrated in FIG. 19A is based on a setting history related to an E-mail transmission job executed at 9:01 on Feb. 22 (2020) in FIG. 18, no prohibition setting is imposed on "sample@local" as a transmission destination. In this case, "sample@local" is set and displayed as a transmission destination of E-mail transmission in the transmission destination display area R28a.

The setting value button display area R30 is a display area in which a representative setting value button related to the E-mail transmission job is displayed. A corresponding value of setting values included in a setting history (setting value file) is reflected and displayed on each setting value button in the setting value button display area R30. Each of the setting values can be changed in accordance with an input of an instruction to change the setting value by pressing a corresponding button by the user.

The operation control button display area R32 is a display area in which an operation control button that receives selection and change of operation control related to execution of an E-mail transmission job is displayed. FIG. 19A illustrates an example in which, as operation control buttons, an external address book button, a history information button, a button used for calling by a search number, a program call button, a transmission history button, and a simple setting button are arranged.

The start button B40 is an input button that receives an input of an instruction to execute an E-mail transmission. The user can input an instruction to execute an E-mail transmission job by pressing the start button B40.

An E-mail setting screen W90b illustrated in FIG. 19B has a same configuration as that of the E-mail setting screen W90a. For example, the E-mail setting screen illustrated in FIG. 19B is based on a setting history (SR10) related to an E-mail transmission job executed at 19:19 on Feb. 22 (2020) in FIG. 18, a prohibition setting is imposed on "AAA@sampleA.co.jp" as a transmission destination. In this case, as a transmission destination of E-mail transmission, "AAA@sampleA.co.jp" is not set but only a transmission destination address of "BBB@sampleB.co.jp" is set in the transmission destination display area R28b.

As has been described above, in the second embodiment, when a prohibition setting is imposed on a specific setting value, a job can be executed using setting values excluding the setting value (transmission destination address) on which the prohibition setting is imposed.

Incidentally, the second embodiment can include a reminder function that sets an expiration date for a prohibition setting and asks the user whether to reset the prohibition setting when the expiration date of the prohibition setting is approaching.

Figure 20A:
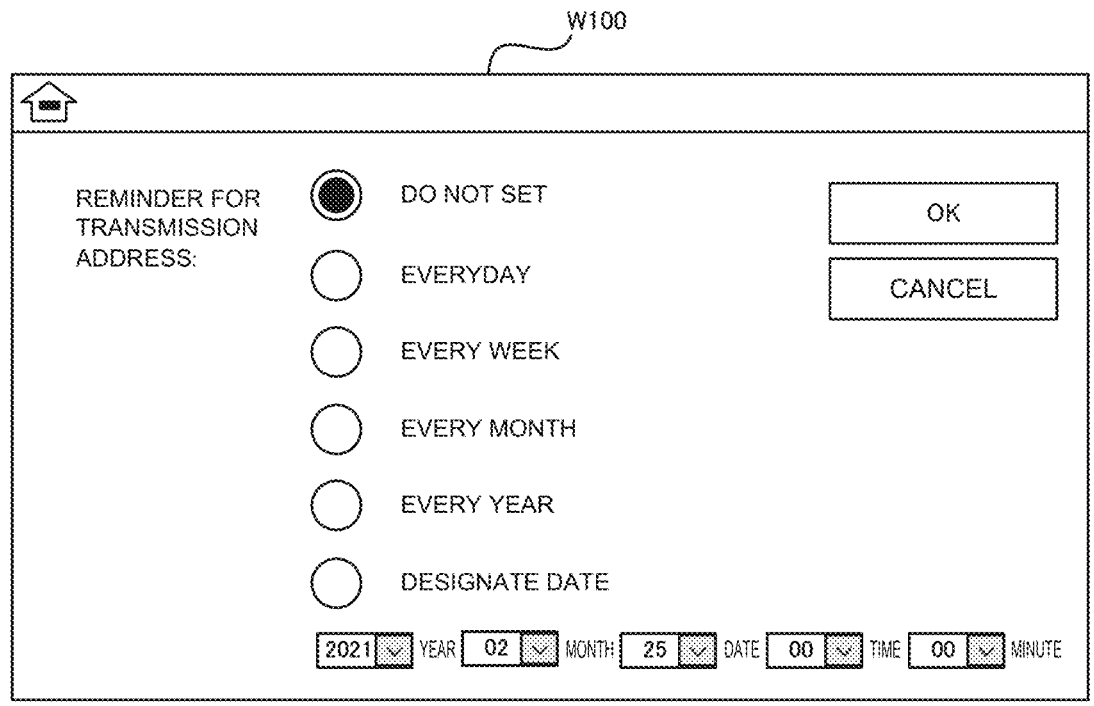
FIGS. 20A and 20B are views each illustrating an operation example according to the second embodiment.

FIG. 20A is a view illustrating a configuration example of a reminder setting screen W100. In the reminder setting screen W100, radio buttons that enable/disable a reminder setting and receive a setting of a reminder period. The reminder function can be set by selecting a radio button related to a desired setting of the user and pressing an OK button.

Figure 20B:
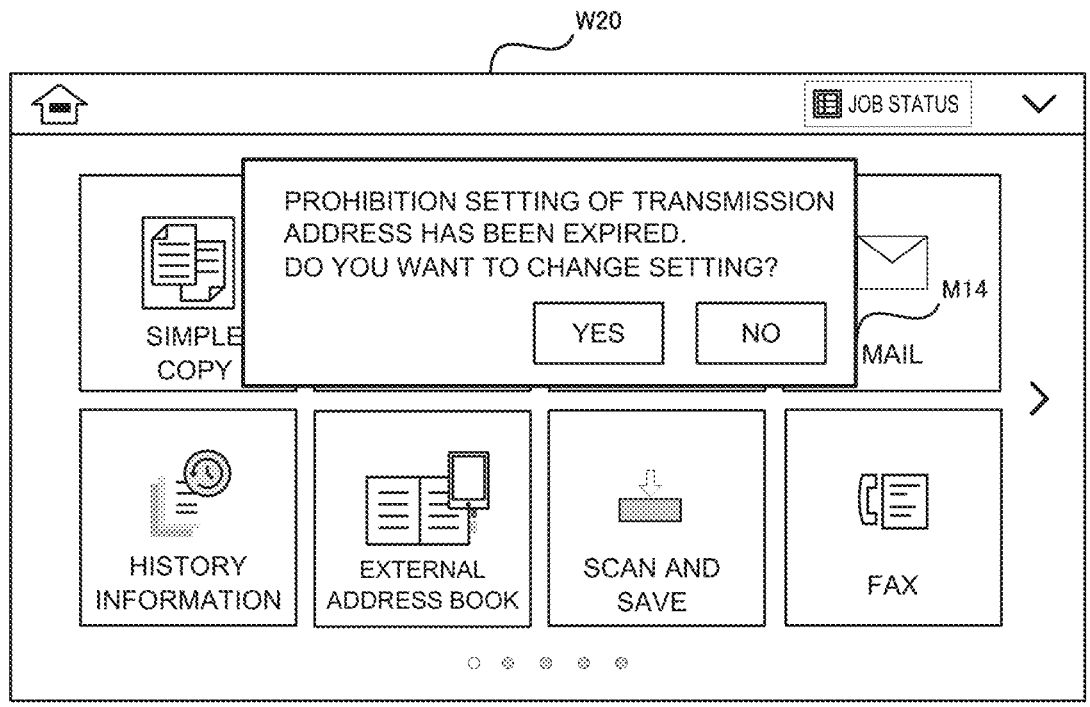

FIG. 20B is a view illustrating a configuration example of a reminder screen M14 displayed when the controller 11 displays the home screen W20, or the like, based on the reminder function set via a reminder setting screen W100. In the reminder screen M14, message contents that encourage the user to reset the expiration date of the prohibition setting can be displayed.

As has been described above, according to the second embodiment, in addition to effects of the first embodiment, when a prohibition setting is imposed on a specific setting value, a job can be executed using setting values excluding the setting value on which the prohibition setting is imposed.

3 Third Embodiment

A third embodiment relates to an exceptional example of the second embodiment. In the third embodiment, in a case where a setting history is a setting history related to sharing, a process related to a prohibition setting is not performed.

A functional configuration according to the third embodiment can be same as those of the first and second embodiments, and therefore, the description thereof will be omitted herein.

FIG. 21 is a view illustrating a configuration example of the setting history display screen W30 on which a setting history in which a shared setting is set is displayed. A sharing setting for the setting history can be performed via an unillustrated sharing setting screen. When a sharing setting is set in the setting history, a sharing setting mark C10 is identifiably attached, as illustrated in the example in FIG. 21.

3.1 Process Flow

Figure 22:
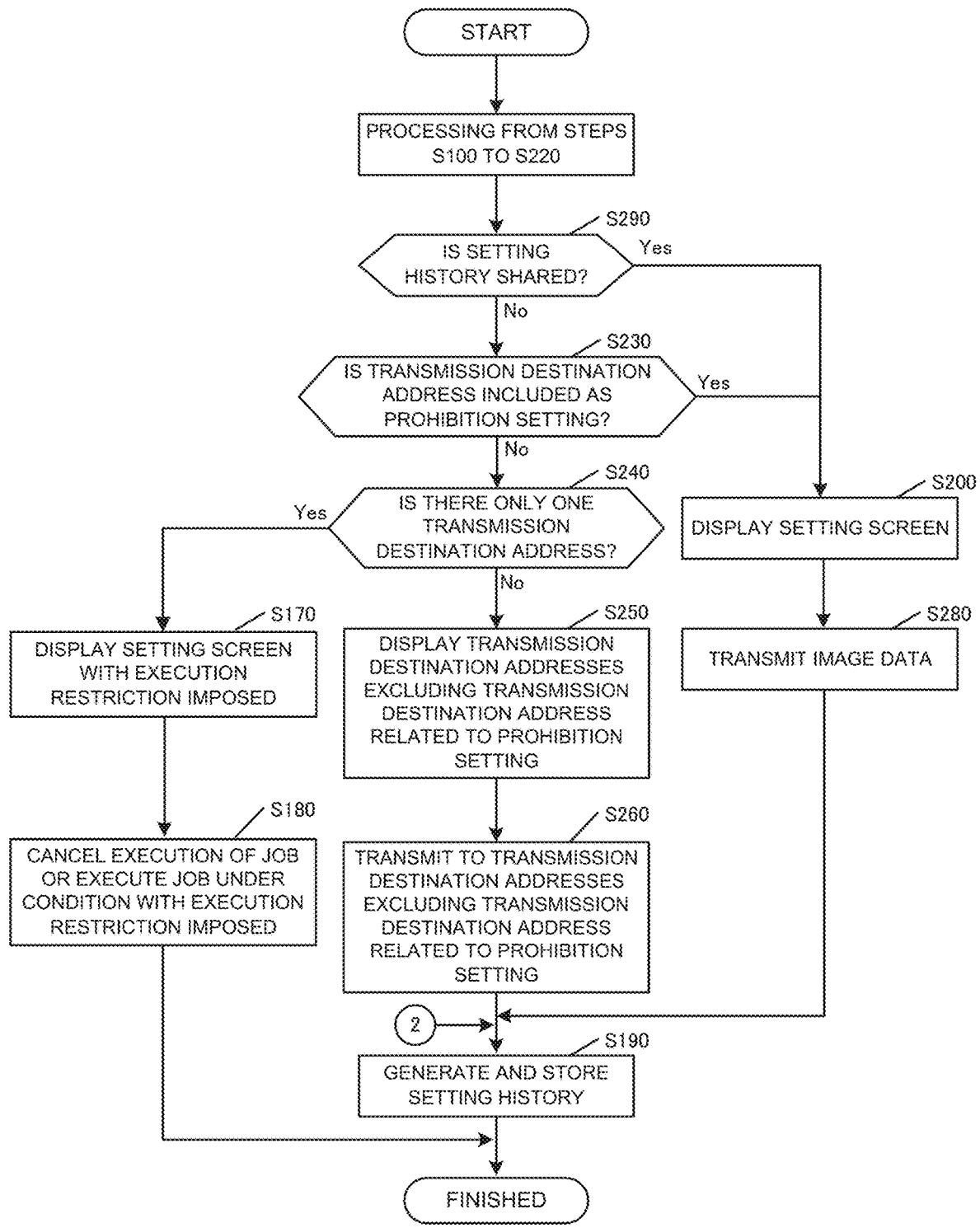
FIG. 22 is a flowchart illustrating a process flow according to the third embodiment.

FIG. 22 is a flowchart illustrating an overall process according to the third embodiment. In the third embodiment, after a process pertaining to Step S220 of the flowchart of FIG. 15 of the second embodiment, a process pertaining to Step S290 is provided, and other processes can be same as those described above. Therefore, description of the same processes will be omitted herein.

If the controller 11 determines that a setting history selected by the user is a job related to an image transmission job, the controller 11 determines whether the setting history is a setting history related to sharing (Step S220; Yes→Step S290).

If the controller 11 determines that the setting history is a setting history related to sharing, the controller 11 treats execution of the job as execution of a normal job on which no execution restriction is imposed and displays a setting screen of the job (Step S290; Yes→Step S200).

On the other hand, if the controller 11 determines that the setting history is not a setting history related to sharing, the controller 11 executes a process pertaining to Step S230 (Step S290; No→Step S230).

As has been described above, according to the third embodiment, in a case where a setting history is a setting history related to sharing, the controller 11 does not perform a process related to a prohibition setting, and therefore, for example, even when the user forgets to release the prohibition setting, same execution results as execution results of the job executed by some other user by appropriating the setting history can be obtained.

The present disclosure is not limited to each of the embodiments described above, and various changes can be made thereto. That is, embodiments obtained by combining techniques modified as appropriate within a range that does not depart from the gist of the present disclosure are also included in the technical scope of the present disclosure.

Although the above-described embodiments include some parts described separately for convenience of description, as a matter of course, the embodiments may be combined and thus executed to the extent technically feasible.

The programs that are operated in each device in the embodiments are programs that control a CPU, or the like (programs that make a computer function) to realize the functions of the embodiments described above. The information handled by the devices is temporarily accumulated in a temporary storage device (for example, a RAM) during processing of the information, and then, is stored in various read only memories (ROM), a HDD, or the like, and is read, modified, and written by the CPU as necessary.

A recording medium used for storing a program may be any one of a semiconductor medium (for example, a ROM, a non-volatile memory card, or the like), an optical recording medium or a magnetooptical recording medium (for example, a digital versatile disc (DVD), a magnetooptical disc (MO), a mini disc (MD), a compact disc (CD), a Blu-ray (registered trademark) disc (BD), or the like), a magnetic recording medium (for example, a magnetic tape, a flexible disk, or the like). Moreover, not only each of the functions of the embodiments described above may be realized by executing a loaded program, but also some of functions of the present disclosure are realized by processing a corresponding program in cooperation with an operating system, some other application program, or the like, based on an instruction of the program.

When distributed in the market, the program can be stored in a portable recording medium for distribution or can be transferred to a server computer connected through a network, such as the Internet or the like. In this case, a storage device of the server computer is, as a matter of course, included in the present disclosure.

What is claimed is:
1. An image processing apparatus comprising:
a job executer that executes a job, related to image processing, based on a setting history;
a setter that sets prohibition on the setting history;
a display that displays setting histories including the setting history on which the prohibition is set; and
one or more controllers that control the execution of the job based on the displayed setting histories,
wherein the setting history includes setting values related to the execution of the job, and the setter sets a specific setting value as a prohibited setting to set the prohibition on the setting history,
in executing the job based on the setting history, the one or more controllers determine whether to restrict the execution of the job based on a result of determination on whether the setting history is the setting history on which the prohibition is set, and if the one or more controllers determine that the setting history is the setting history on which the prohibition is set, the one or more controllers execute the job based on the setting history using the setting values excluding the specific setting value that is set as prohibited.

2. The image processing apparatus according claim 1, wherein the specific setting value includes a transmission destination address of image data based on the image processing.

3. The image processing apparatus according claim 2, wherein the one or more controllers display, on the display, an input screen that receives a manual input of the transmission destination address.

4. The image processing apparatus according claim 2, wherein the one or more controllers receive an automatic input of the transmission destination address.

5. The image processing apparatus according claim 2, wherein the one or more controllers manage an expiration date of the transmission destination address.

6. The image processing apparatus according claim 1, wherein, when the execution of the job based on the setting history is restricted, the one or more controllers display a reason for the restriction on the display.

7. The image processing apparatus according claim 1, wherein, in a case that a sharing setting is set on the setting history, even when the setting history is the setting history on which the prohibition is set, the one or more controllers execute the job based on the setting history.

8. A job execution control method comprising:
executing a job, related to image processing, based on a setting history;
setting prohibition on the setting history;
displaying setting histories including the setting history on which the prohibition is set; and
controlling the execution of the job based on the displayed setting histories,
wherein the setting history includes setting values related to the execution of the job,
setting the prohibition on the setting history comprises setting a specific setting value as a prohibited setting,
controlling the execution of the job comprises determining, in executing the job based on the setting history, whether to restrict the execution of the job based on a result of determination on whether the setting history is the setting history on which the prohibition is set, and
if determining that the setting history is the setting history on which the prohibition is set, the job execution control method further comprises executing the job based on the setting history using the setting values excluding the specific setting value that is set as prohibited.

9. An image processing apparatus comprising:
a job executer that executes a job, related to image processing, based on a setting history;
a setter that sets prohibition on the setting history;
a display that displays setting histories including the setting history on which the prohibition is set; and
one or more controllers that control the execution of the job based on the displayed setting histories,
wherein the setting history includes setting values related to the execution of the job, and the setter sets a specific setting value as a prohibited setting to set the prohibition of the setting history,
in executing the job based on the setting history, the one or more controllers determine whether to restrict the execution of the job based on a result of determination on whether the setting history is the setting history on which the prohibition is set, and
if the one or more controllers determine that the setting history is the setting history on which the prohibition is set, the one or more controllers restrict the execution of the job based on the setting history, and
when the execution of the job based on the setting history is restricted, the one or more controllers display a reason for the restriction on the display.

* * * * *